(12) United States Patent
Kannan

(10) Patent No.: US 12,335,380 B2
(45) Date of Patent: Jun. 17, 2025

(54) PREVENTION OF UNAUTHORIZED MIGRATION OF WIRELESS ACCESS POINTS ACROSS SERVICE PROVIDERS

(71) Applicant: ARRIS Enterprises LLC, Suwanee, GA (US)

(72) Inventor: Navneeth N. Kannan, Doylestown, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 227 days.

(21) Appl. No.: 17/374,102

(22) Filed: Jul. 13, 2021

(65) Prior Publication Data

US 2022/0038274 A1     Feb. 3, 2022

Related U.S. Application Data

(60) Provisional application No. 63/058,145, filed on Jul. 29, 2020.

(51) Int. Cl.
| | |
|---|---|
| *H04L 9/08* | (2006.01) |
| *H04L 29/12* | (2006.01) |
| *H04L 101/622* | (2022.01) |

(52) U.S. Cl.
CPC .......... *H04L 9/0866* (2013.01); *H04L 9/0825* (2013.01); *H04L 9/0869* (2013.01); *H04L 2101/622* (2022.05)

(58) Field of Classification Search
CPC ... H04L 9/0866; H04L 9/0825; H04L 9/0869; H04L 2101/622
See application file for complete search history.

(56) References Cited

U.S. PATENT DOCUMENTS

| 10,313,342 B1 * | 6/2019 | Caldwell ............... H04L 63/102 |
| 10,509,688 B1 | 12/2019 | Zelenov et al. |

(Continued)

FOREIGN PATENT DOCUMENTS

| EP | 0 950 954 | 10/1999 |
| WO | 2013/153022 | 10/2013 |

OTHER PUBLICATIONS

International Search Report issued Nov. 5, 2021 in International (PCT) Application No. PCT/US2021/044938.

(Continued)

*Primary Examiner* — Phy Anh T Vu
(74) *Attorney, Agent, or Firm* — Wenderoth, Lind & Ponack, L.L.P.

(57) ABSTRACT

A server device includes a memory; and a processor configured to execute instructions stored on the memory to cause the server device to obtain unique data associated with a network device, store, into the memory, at least one of a first key and a first seed, the first key being associated with the network device and being based on the unique data, the first seed being associated with the network device, being based on the unique data, and for use to create a second key, obtain user information identifying a user to be associated with the network device, store, into the memory, the association of the user with the network device, obtain service provider information identifying a first service provider to provide service to the user via the network device, and store, into the memory, the association of the first service provider with the network device.

30 Claims, 15 Drawing Sheets

(56) References Cited

U.S. PATENT DOCUMENTS

| | | | |
|---|---|---|---|
| 11,233,789 B1* | 1/2022 | Caldwell | G06Q 30/06 |
| 11,765,154 B2* | 9/2023 | Eichen | H04L 9/3263 |
| | | | 713/168 |
| 2010/0214956 A1* | 8/2010 | Law | H04W 12/122 |
| | | | 370/255 |
| 2015/0230061 A1 | 8/2015 | Srivastava | |
| 2015/0289300 A1* | 10/2015 | Zhang | H04W 8/18 |
| | | | 370/328 |
| 2016/0026997 A1* | 1/2016 | Tsui | G06Q 20/322 |
| | | | 705/44 |
| 2017/0244592 A1* | 8/2017 | Mahapatra | H04L 45/20 |
| 2018/0218446 A1* | 8/2018 | Ries | H04L 63/0853 |
| 2020/0064816 A1* | 2/2020 | Yasu | H04L 67/12 |
| 2021/0320807 A1* | 10/2021 | Uy | H04L 63/0838 |
| 2021/0389958 A1* | 12/2021 | Choi | G06F 21/572 |

OTHER PUBLICATIONS

International Preliminary Report on Patentability dated Jan. 31, 2023 in International (PCT) Application No. PCT/US2021/044938.

* cited by examiner

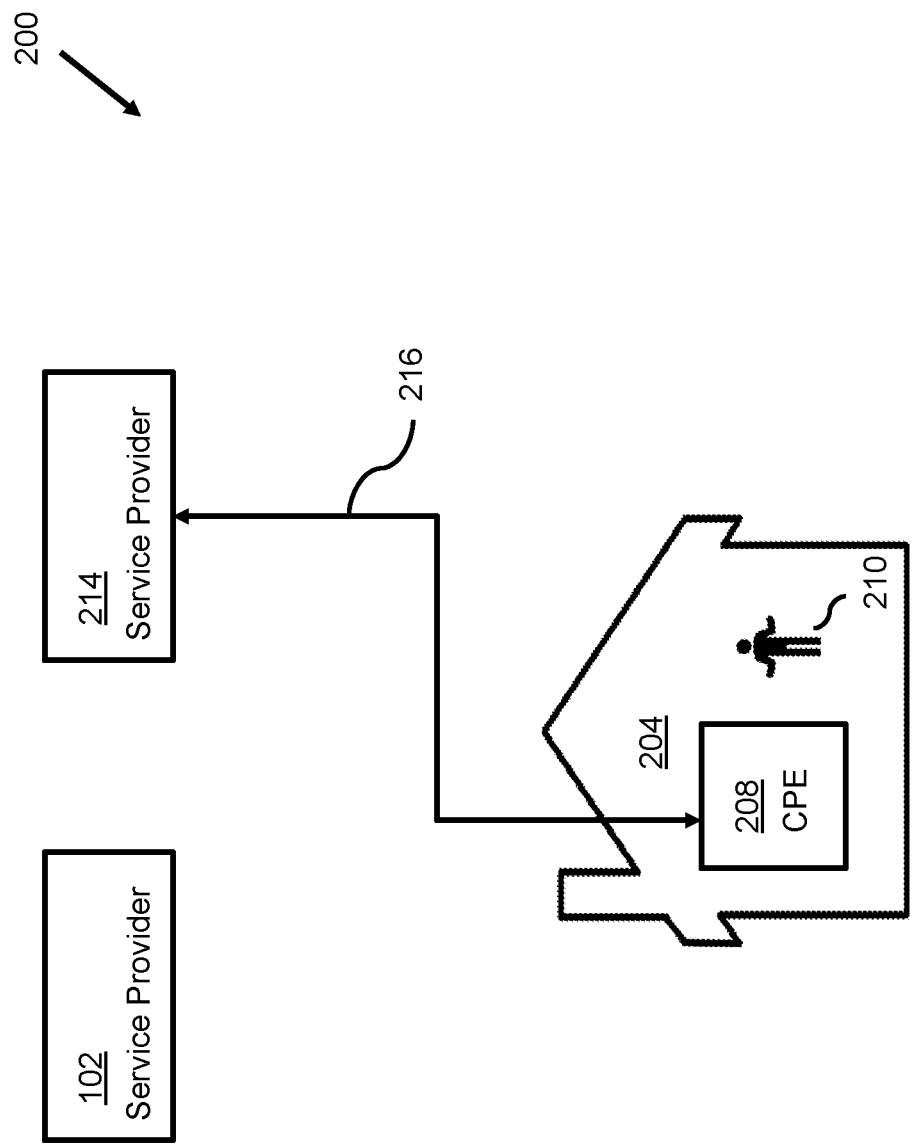

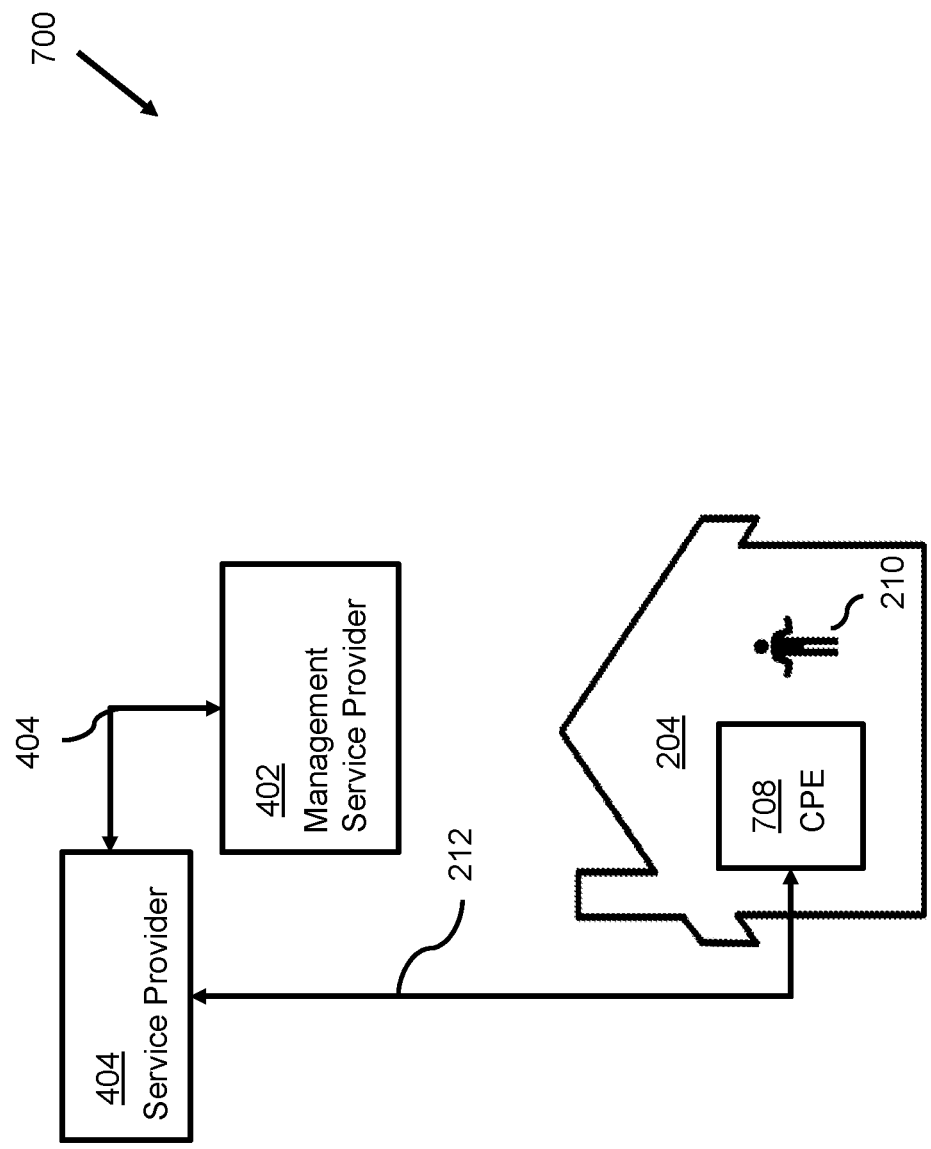

PREVENTION OF UNAUTHORIZED MIGRATION OF WIRELESS ACCESS POINTS ACROSS SERVICE PROVIDERS

BACKGROUND

Embodiments of the invention relate to preventing unauthorized migration of wireless access points across service providers.

SUMMARY

Aspects of the present invention are drawn to a server device for use with a network device. The server device includes a memory; and a processor configured to execute instructions stored on the memory to cause the server device to obtain unique data associated with the network device, store, into the memory, at least one of a first key and a first seed, the first key being associated with the network device and being based on the unique data, the first seed being associated with the network device, being based on the unique data, and for use to create a second key, obtain user information identifying a user to be associated with the network device, store, into the memory, the association of the user with the network device, obtain service provider information identifying a first service provider to provide service to the user via the network device, and store, into the memory, the association of the first service provider with the network device.

In some embodiments the processor is further configured to execute instructions stored on the memory to additionally cause the server device to store, into the memory, a first set of privileges associated with the network device when the network device is associated with the user and the network device is associated with the first service provider.

In some embodiments the processor is further configured to execute instructions stored on the memory to additionally cause the server device to receive a provisioning request from the network device to provision the network device with a second service provider, the provisioning request includes a third key, and provision the network device with the first set of privileges when the third key corresponds to the first key. In some further embodiments the processor is further configured to execute instructions stored on the memory to additionally cause the server device to provision the network device with a second set of privileges when the third key does not correspond to the first key.

In some embodiments the processor is further configured to execute instructions stored on the memory to additionally cause the server device to store, into the memory, the first seed, create the second key using the first seed; receive a provisioning request from the network device to provision the network device with a second service provider, the provisioning request includes a third key, and provision the network device with the first set of privileges when the third key corresponds to the second key. In some further embodiments the processor is further configured to execute instructions stored on the memory to additionally cause the server device to provision the network device with a second set of privileges when the third key does not correspond to the second key.

In some embodiments the processor is further configured to execute instructions stored on the memory to additionally cause the server device to obtain the unique data associated with the network device as a first media access control (MAC) address of the network device, receive a provisioning request from the network device to provision the network device with a second service provider, the provisioning request includes a second MAC address of the network device, and provision the network device with the first set of privileges when the first MAC address corresponds to the second MAC address. In some further embodiments the processor is further configured to execute instructions stored on the memory to additionally cause the server device to provision the network device with a second set of privileges when the first MAC address does not correspond to the second MAC address.

In some embodiments the processor is further configured to execute instructions stored on the memory to additionally cause the server device to receive a provisioning request from the network device to provision the network device with a second service provider, the provisioning request includes second service provider information identifying a second service provider to provide service to the user via the network device, and provision the network device with the first set of privileges when the first service provider corresponds to the second service provider. In some further embodiments the processor is further configured to execute instructions stored on the memory to additionally cause the server device to provision the network device with a second set of privileges when the first service provider does not correspond to the second service provider.

Aspects of the present invention are drawn to a method of using a server device with a network device. The method includes obtaining, via a processor configured to execute instructions stored on a memory, unique data associated with the network device; storing, via the processor and into the memory, at least one of a first key and a first seed, the first key being associated with the network device and being based on the unique data, the first seed being associated with the network device, being based on the unique data, and for use to create a second key; obtaining, via the processor, user information identifying a user to be associated with the network device; storing, via the processor and into the memory, the association of the user with the network device; obtaining, via the processor, service provider information identifying a first service provider to provide service to the user via the network device; and storing, via the processor and into the memory, the association of the first service provider with the network device.

In some embodiments the method further includes storing, via the processor and into the memory, a first set of privileges associated with the network device when the network device is associated with the user and the network device is associated with the first service provider.

In some embodiments the method further includes receiving, via the processor, a provisioning request from the network device to provision the network device with a second service provider, the provisioning request includes a third key; and provisioning, via the processor, the network device with the first set of privileges when the third key corresponds to the first key. In some further embodiments the method further includes provisioning, via the processor, the network device with a second set of privileges when the third key does not correspond to the first key.

In some embodiments the method further includes storing, via the processor and into the memory, the first seed, creating, via the processor, the second key using the first seed; receiving, via the processor, a provisioning request from the network device to provision the network device with a second service provider, the provisioning request includes a third key; and provisioning, via the processor, the network device with the first set of privileges when the third key corresponds to the second key. In some further embodiments the method further includes provisioning, via the processor, the network device with a second set of privileges when the third key does not correspond to the second key.

In some embodiments the method further includes obtaining, via the processor, the unique data associated with the network device as a first MAC address of the network device; receiving, via the processor, a provisioning request from the network device to provision the network device with a second service provider, the provisioning request includes a second MAC address of the network device; and provisioning, via the processor, the network device with the first set of privileges when the first MAC address corresponds to the second MAC address. In some further embodiments the method further includes provisioning, via the processor, the network device with a second set of privileges when the first MAC address does not correspond to the second MAC address.

In some embodiments the method further includes receiving, via the processor, a provisioning request from the network device to provision the network device with a second service provider, the provisioning request includes second service provider information identifying a second service provider to provide service to the user via the network device; and provisioning, via the processor, the network device with the first set of privileges when the first service provider corresponds to the second service provider. In some further embodiments the method further includes provisioning, via the processor, the network device with a second set of privileges when the first service provider does not correspond to the second service provider.

Aspects of the present invention are drawn to a non-transitory, computer-readable media having computer-readable instructions stored thereon. The computer-readable instructions are capable of being read by a server device for use with a network device, wherein the computer-readable instructions are capable of instructing the server device to perform the method including obtaining, via a processor configured to execute instructions stored on a memory, unique data associated with the network device; storing, via the processor and into the memory, at least one of a first key and a first seed, the first key being associated with the network device and being based on the unique data, the first seed being associated with the network device, being based on the unique data, and for use to create a second key; obtaining, via the processor, user information identifying a user to be associated with the network device; storing, via the processor and into the memory, the association of the user with the network device; obtaining, via the processor, service provider information identifying a first service provider to provide service to the user via the network device; and storing, via the processor and into the memory, the association of the first service provider with the network device.

In some embodiments the computer-readable instructions are capable of instructing the server device to perform the method further including storing, via the processor and into the memory, a first set of privileges associated with the network device when the network device is associated with the user and the network device is associated with the first service provider.

In some embodiments the computer-readable instructions are capable of instructing the server device to perform the method further includes receiving, via the processor, a provisioning request from the network device to provision the network device with a second service provider, the provisioning request includes a third key; and provisioning, via the processor, the network device with the first set of privileges when the third key corresponds to the first key. In some further embodiments the computer-readable instructions are capable of instructing the server device to perform the method further including provisioning, via the processor, the network device with a second set of privileges when the third key does not correspond to the first key.

In some embodiments the computer-readable instructions are capable of instructing the server device to perform the method further includes storing, via the processor and into the memory, the first seed, creating, via the processor, the second key using the first seed; receiving, via the processor, a provisioning request from the network device to provision the network device with a second service provider, the provisioning request includes a third key; and provisioning, via the processor, the network device with the first set of privileges when the third key corresponds to the second key. In some further embodiments the computer-readable instructions are capable of instructing the server device to perform the method further including provisioning, via the processor, the network device with a second set of privileges when the third key does not correspond to the second key.

In some embodiments the computer-readable instructions are capable of instructing the server device to perform the method further includes obtaining, via the processor, the unique data associated with the network device as a first MAC address of the network device; receiving, via the processor, a provisioning request from the network device to provision the network device with a second service provider, the provisioning request includes a second MAC address of the network device; and provisioning, via the processor, the network device with the first set of privileges when the first MAC address corresponds to the second MAC address. In some further embodiments the computer-readable instructions are capable of instructing the server device to perform the method further including provisioning, via the processor, the network device with a second set of privileges when the first MAC address does not correspond to the second MAC address.

In some embodiments the computer-readable instructions are capable of instructing the server device to perform the method further includes receiving, via the processor, a provisioning request from the network device to provision the network device with a second service provider, the provisioning request includes second service provider information identifying a second service provider to provide service to the user via the network device; and provisioning, via the processor, the network device with the first set of privileges when the first service provider corresponds to the second service provider. In some further embodiments the computer-readable instructions are capable of instructing the server device to perform the method further including provisioning, via the processor, the network device with a second set of privileges when the first service provider does not correspond to the second service provider.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 2C further illustrates the network of FIG. 2A at a time $t_6$;

FIG. 7A illustrates another network in accordance with aspects of the present disclosure at a time $t_{10}$;

DETAILED DESCRIPTION

Figure 1A:
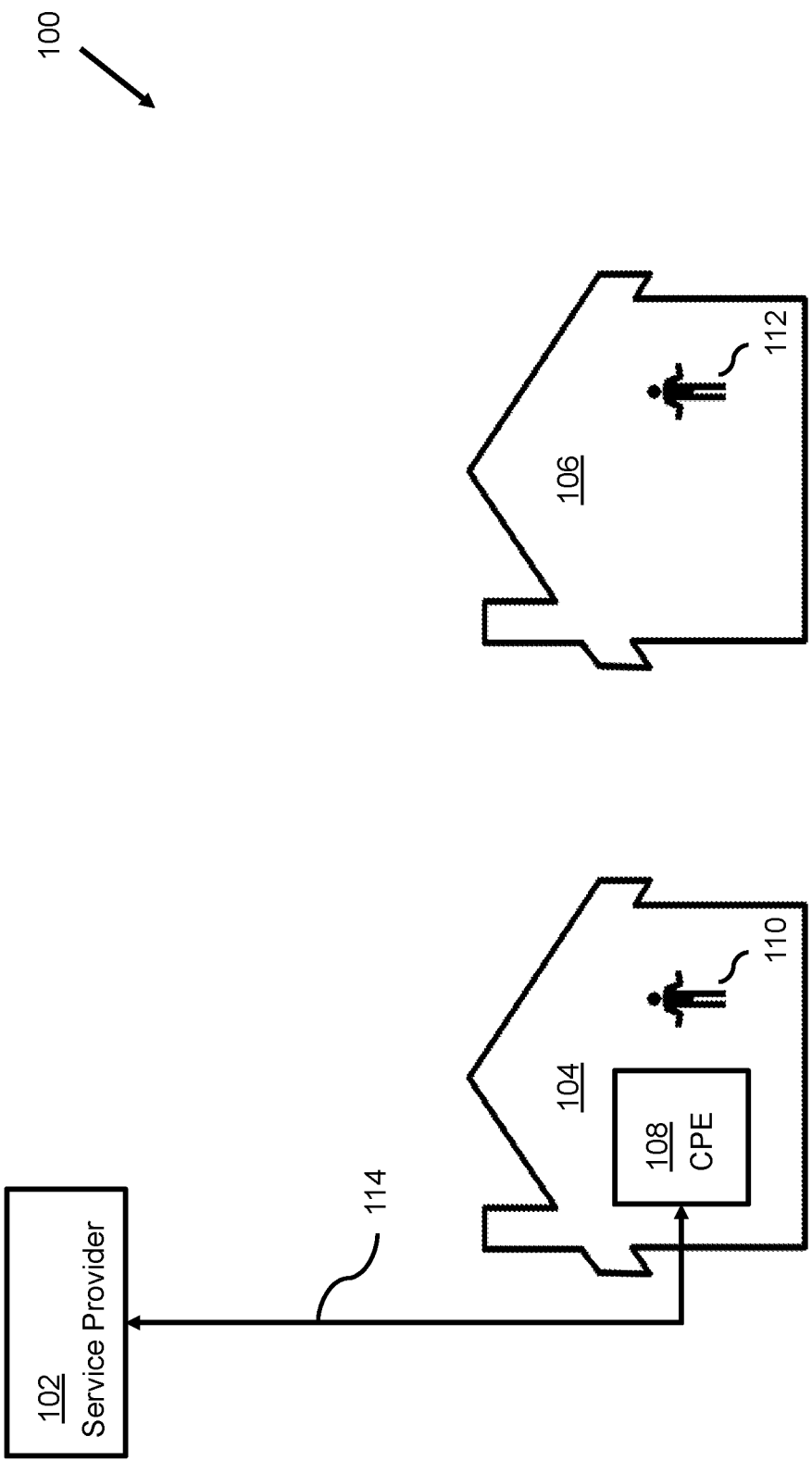
FIG. 1A illustrates a conventional network at a time $t_1$.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Ubiquitous wireless access in the home is becoming a necessity. Internet Service Providers (ISP) across cable and telecommunication businesses have long recognized that in addition to providing Internet access, they provide Wi-Fi service in the home. Typically, wireless service is provided by a gateway that also serves as the termination point to the Wide Area Network (WAN) side. For instance, in the case of a cable company, the Data Over Cable Service Interface Specification (DOCSIS) modem and wireless router are often packaged into a single unit that serves as the connection to the access side as well as the wireless gateway to the home. These terminal units are tied to the service provider and managed directly by them. Most service providers are able to identify modems that are not registered to their network through traditional device management techniques.

As the number of wireless clients in the home continues to increase, a single wireless gateway is often not able to support the coverage requirements for the entire home and is therefore augmented with additional nodes, often called mesh nodes, to increase coverage. These nodes connect by wire or wirelessly to the main gateway. However, the inventors have identified that this increase has created an environment that leads to the problem of there being nothing in both connection alternatives that specifically ties these access points to the service provider.

The commercial model followed by many service providers involves leasing the gateway devices for a monthly rent. For example, a device that is bought at a price of $60 may be leased as part of a service, for example, at $5 a month. The provider expects that the capital expense will be amortized over a 12-month period. Depending on the region and the ability to charge the customer, the amortization period could be longer. In this model, the expectation is that when an end-subscriber cancels the service mid-way through the period, then the subscriber will turn in the leased devices, allowing the provider to then deploy the device to a different location.

There are regions in the world where some of the subscribers may cancel a service within a month or so and fail to return the devices. Typically, when these devices are tied to the access network and therefore the service provider, they generally cannot be provisioned even if the subscriber tries to sign up with an alternate provider, while using the existing device as a Bring Your Own Device (BYOD), in order to avoid the monthly lease payments.

Wireless access points, as opposed to an access gateway, do not have a specific tie-back into the service provider network. Even if the original service provider maintains the association between the device-specific information like MAC addresses of the devices issued and the customer identification, that will not help when the subscriber uses the device with a new service provider as a BYOD option. The new service provider will not have enough visibility of the device to enable countering a claim by the subscriber that such an access point is their own device. The device would only appear as an access point that is not within the new service provider's inventory.

The above discussion is about wireless access points without access technology. However, it is feasible under certain circumstances for a subscriber to cancel an internet service, not return the integrated gateway device, and try to use the same device with an alternate service provider as a BYOD modem. For example, this can occur when the second service provider allows for a BYOD type service and does not insist the subscriber leases the device from them.

Conventional examples of unauthorized migration of a device of a service provider will now be described with reference to FIGS. 1A-2C.

A first conventional example of unauthorized migration of a device of a service provider by illicitly transferring the device to another user will now be described with reference to FIGS. 1A-1C.

FIG. 1A illustrates a conventional network 100 at a time $t_1$.

As shown in the figure, network 100 includes a service provider 102, a consumer location 104, a service consumer location 106, and a communication channel 114. Service consumer location 104 includes Customer Premises Equipment (CPE) 108 and a user 110. Service consumer location 106 includes a user 112.

Service provider 102 includes head-end equipment such as server computers (e.g., automatic configuration server ACS) that enable a service provider, such as a cable television provider, a satellite television provider, an internet service provider, or multiple-systems operator (MSO), to provide content (such as audio/video content and/or internet service) either through physical media/wiring, such as a coaxial network, an optical fiber network, and/or DSL, or a wireless network, such as a satellite or terrestrial antenna implemented network, or a combination of any of these examples or their equivalents. The data communicated on such network can be implemented using a variety of protocols on a network such as a wide area network (WAN), a virtual private network (VPN), metropolitan area networks (MANs), system area networks (SANs), a public switched telephone network (PTSA), a global Telex network, or a 2G, 3G, 4G or 5G network accessible via communication channel 114, which may include physical media/wiring. Such networks can also generally contextually be referred to herein as the internet or the cloud.

Non-limiting examples of CPE 108 include a wired or wireless router, wired or wireless gateway device, a set-top box, and a wireless access point device.

Service provider 102 is configured to communicate with CPE 108 by way of communication channel 114. Communication channel 114 transfers data using a known communication protocol. Without limitation, one example known communication protocol is called DOCSIS. DOCSIS is a global telecommunications standard that permits high-bandwidth data transfer to CPE 108 over fiber-optic or coaxial infrastructure. DOCSIS has two main components: the physical (PHY) layer and the media access control (MAC) layer. The physical layer pertains to the wiring and routing equipment used, as well as the frequency at which data is transmitted through these various physical systems. The MAC layer manages the information being processed, preventing "traffic jams" caused by signals colliding with one another. Each device on a network has a MAC address tied to it, which acts as a unique device ID.

Consider, for purposes of discussion, that user 110 has signed up for a service provided by service provider 102, e.g., Wi-Fi service. When signing up for this service, user 110 obtains CPE 108 from service provider 102 with a requirement that user 110 will return CPE to the company operating service provider 102 at the termination of the service. Service provider 102 then provisions CPE 108 to be operational so as to use a service provided by service provider 102. CPE 108 is listed in a memory of service provider 102 to keep track of possession of CPE 108. While service provider 102 is providing a service to user 102 for use by CPE 108, user 110 pays the company operating service provider 102 for the service. It should be noted that the amount of payment by user 102 is negotiated to correspond to a level of service, or a predetermined amount of privileges tied to CPE 108.

However, a problem arises when user 110 attempts to gain a higher level of service, obtain service after termination of service by service provider 102, or obtain different privileges. This will be described in greater detail with reference to FIGS. 1B-C.

Figure 1B:
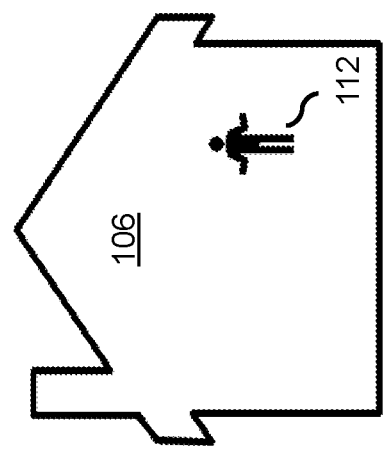
FIG. 1B illustrates the network of FIG. 1A at a time $t_2$.
Figure 1B:
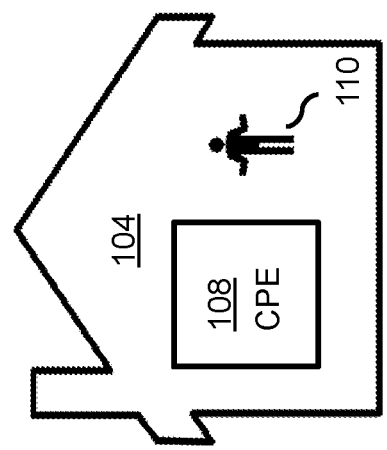

FIG. 1B illustrates network 100 at a time $t_2$.

As shown in FIG. 1B, service provider 102 has terminated service with CPE 108.

At time $t_2$, user 110 is no longer receiving service from service provider 102. In accordance with the agreement, user 110 should return CPE 108. However, there may be instances when a user illicitly does not return a CPE to the operator of service provider 102. For purposes of discussion, suppose that user 110 does not return CPE 108 to the operator of service provider 102. This will be described with reference to FIG. 1C.

Figure 1C:
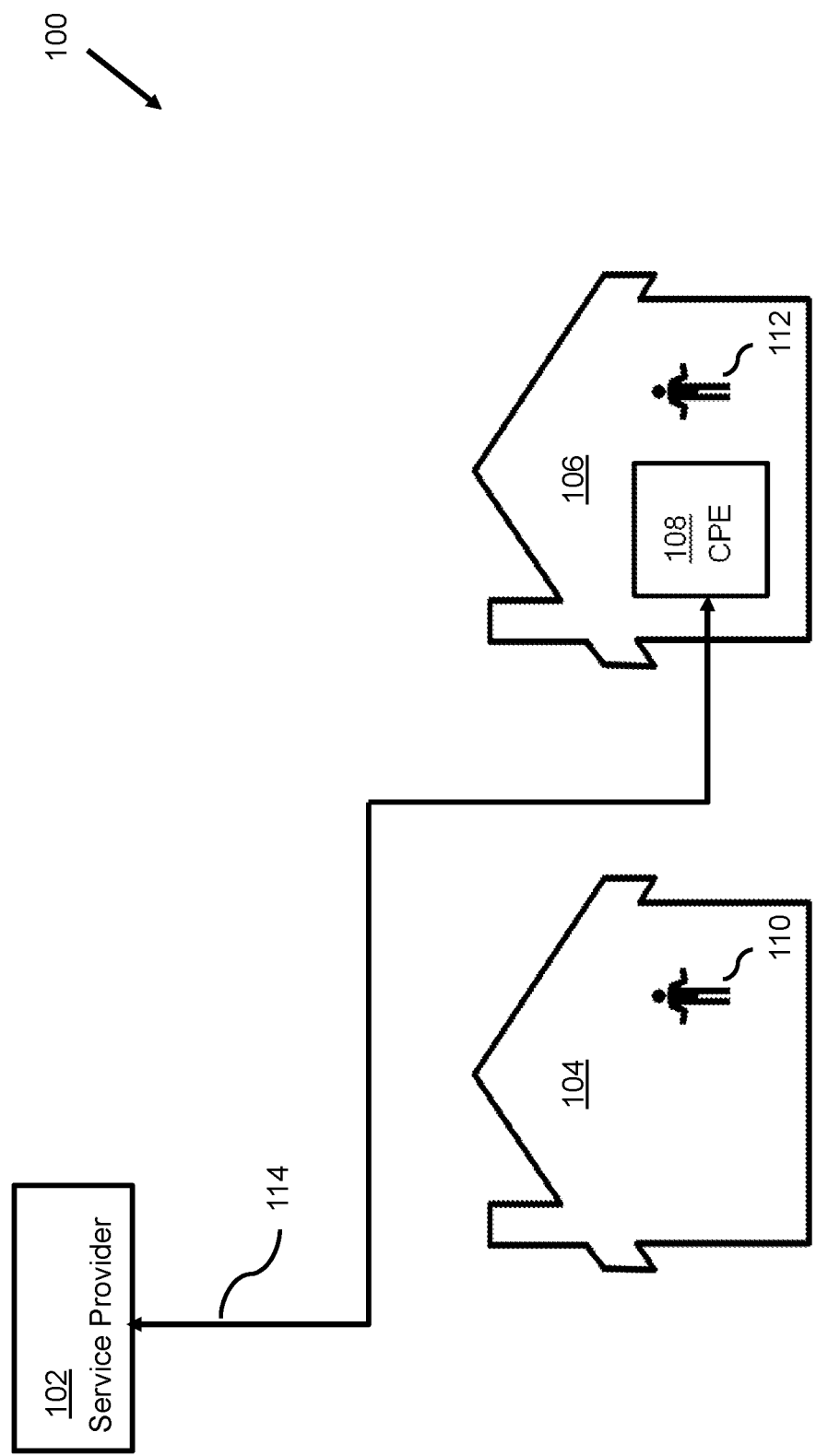
FIG. 1C illustrates the network of FIG. 1A at a time $t_3$.

FIG. 1C illustrates network 100 of FIG. 1A at a time $t_3$.

As shown in FIG. 1C, service consumer location 104 includes user 110. Service consumer location 106 includes CPE 108 and user 112.

Service provider 102 is configured to communicate with CPE 108 by way of communication channel 114.

Consider for purposes of discussion that user 110 has sold CPE 108 to user 112. The problem here is that CPE 108 was not the property of user 110. On the contrary, CPE 108 was the property of the operator of service provider 102, wherein CPE 108 was provided to user 110 with a requirement that user 110 will return CPE 108 to the company operating service provider 102 at the termination of the service. However, as noted above with reference to FIG. 1B, in this scenario user 110 did not return CPE 108 to the operator of service provider 102.

Further, for purposes of discussion, suppose that the operator of service provider 102 offers services at a discount price if the operator of service provider 102 does not have to provide a CPE. This is known in the industry as a Bring Your Own Device (BYOD) discount. In this example, suppose that the operator of service provider 102 has offered user 112 the same level of service that was offered to user 110, but at a discount BYOD monthly service charge because user 112 has indicated that they have their "own device." In this case, the device of user 112 is the illicitly transferred CPE 108.

As a result of this situation, user 110 has received payment from user 112 for CPE 108, even though CPE 108 was not the property of user 110. Further, user 112 is receiving a discounted monthly service charge because they are using CPE 108 that is represented as being owned by user 112, when in actuality CPE 108 is owned by the operator of service provider 102. In the end, the operator of service provider 102 is at a loss of the value of CPE 108 because user 110 did not return CPE 108 at the termination of service, and the operator of service provider 102 is losing the additional monthly service fee that user 112 would otherwise be paying if they didn't have the illicitly owned CPE 108.

FIGS. 1A-C shows an example of when CPE 108 migrates within the network of service provider 102, creating a potential for theft of service.

A second conventional example of unauthorized migration of a device of a service provider by illicitly transferring the device to another service provider will now be described with reference to FIGS. 2A-2C.

Figure 2A:
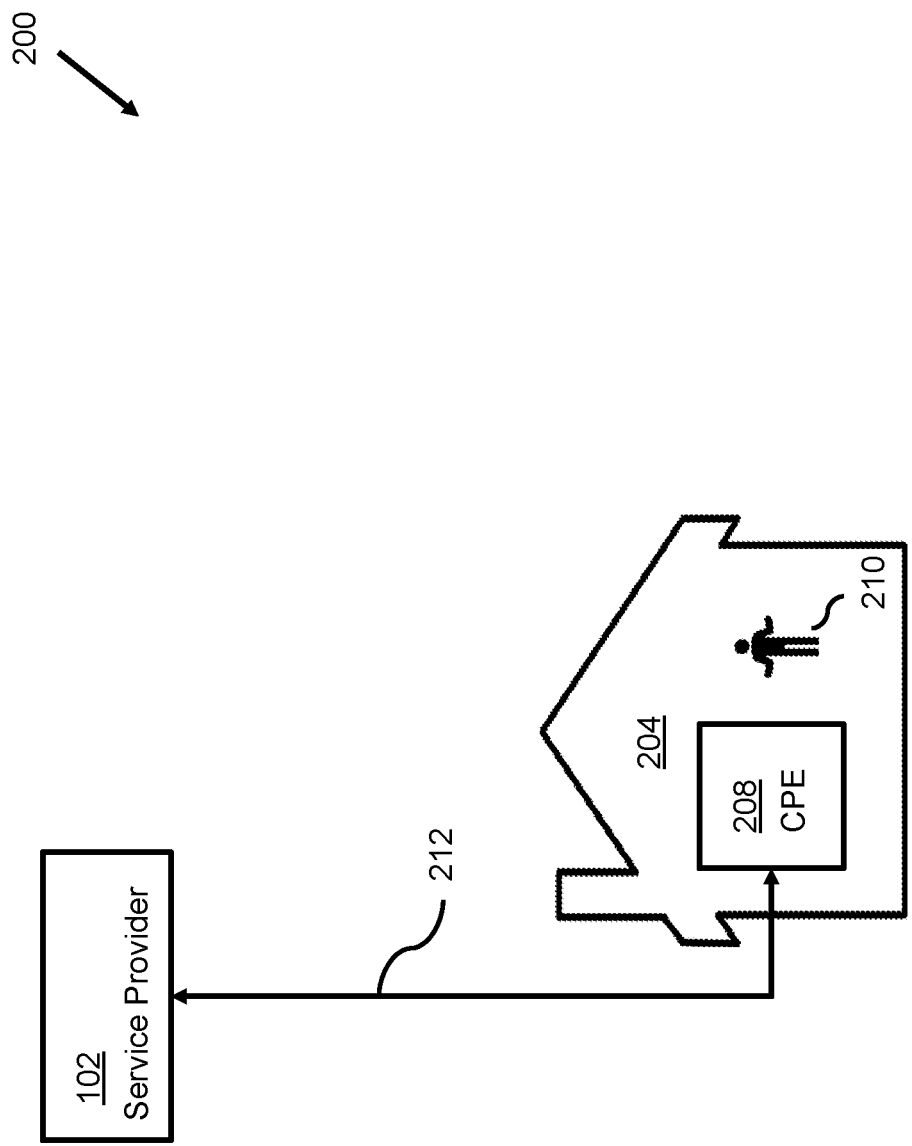
FIG. 2A illustrates another conventional network at a time $t_4$.

FIG. 2A illustrates a conventional network 200 at a time $t_4$.

As shown in the figure, network 200 includes a service provider 102, a service consumer location 204, and a communication channel 212. Service consumer location 204 includes a CPE 208 and a user 210.

Service provider 102 is configured to communicate with CPE 208 by way of communication channel 212, which may include physical media/wiring similar to communication channel 114 discussed above with reference to FIG. 1A.

Consider, for purposes of discussion that user 210 has signed up for a service provided by service provider 102, e.g., Wi-Fi service. When signing up for this service, user 210 obtains CPE 208 from service provider 102 with a requirement that user 210 will return CPE to the company operating service provider 102 at the termination of the service. Service provider 102 then provisions CPE 208 to be operational so as to use a service provided by service provider 102. CPE 208 is listed in a memory of service provider 102 to keep track of possession of CPE 208. While service provider 102 is providing a service to user 210 for use by CPE 208, user 210 pays the company operating service provider 102 for the service. It should be noted that the amount of payment by user 210 is negotiated to correspond to a level of service, or a predetermined amount of privileges tied to CPE 208.

However, a problem arises when user 208 attempts to gain different service from another service provider after termination of service by service provider 102, or obtain different privileges. This will be described in greater detail with reference to FIGS. 2B-C.

Figure 2B:
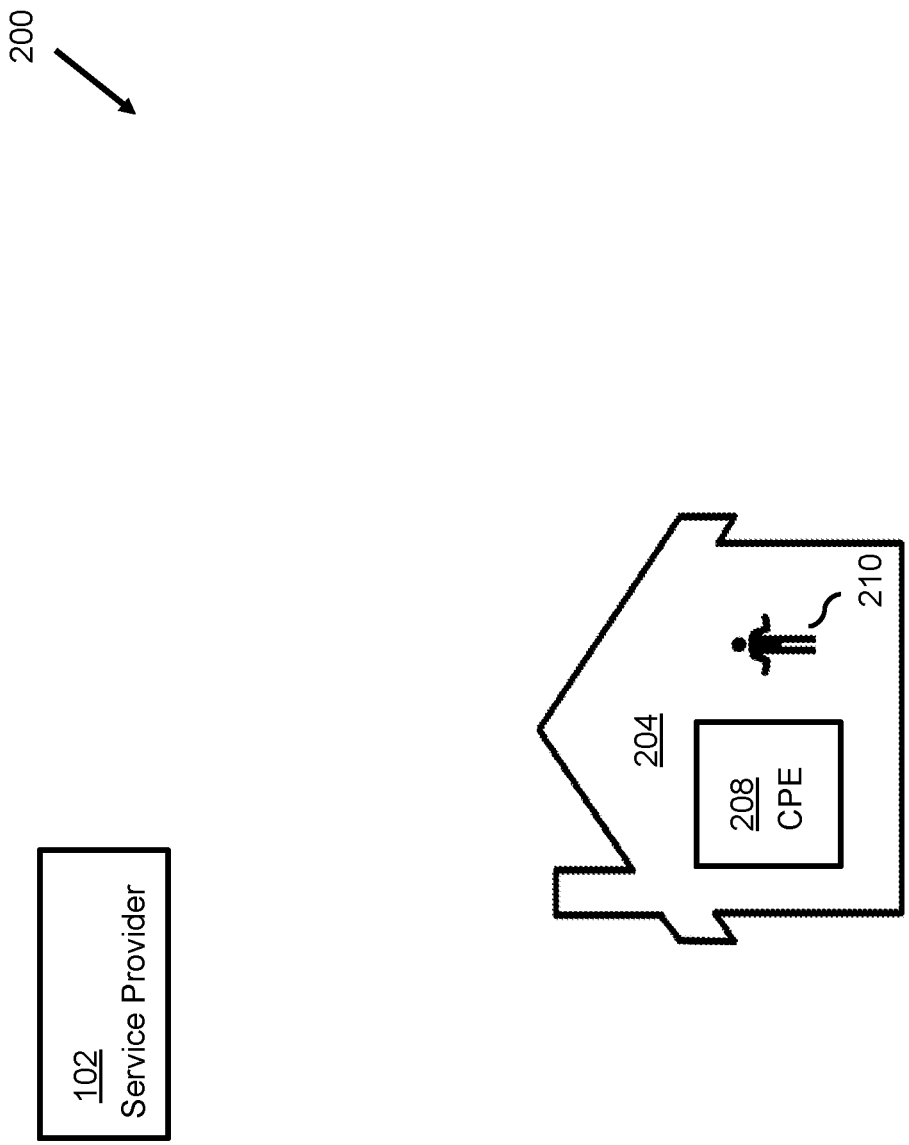
FIG. 2B further illustrates the network of FIG. 2A at a time $t_5$.

FIG. 2B illustrates network 200 at a time $t_5$.

As shown in FIG. 2B, service provider 102 is terminated service with CPE 208.

At time $t_5$, user 210 is no longer receiving service from service provider 102. In accordance with the agreement, user 210 should return CPE 208. However, there may be instances when a user illicitly does not return a CPE to the operator of service provider 102. For purposes of discussion, suppose that user 210 does not return CPE 208 to the operator of service provider 102. This will be described with reference to FIG. 2C.

FIG. 2C illustrates network 200 of FIG. 2A at a time $t_6$.

As shown in FIG. 2C, network 200 includes a service provider 214 and a communication channel 216. Service provider 214 is configured to communicate with CPE 208 by way of communication channel 216, which may include physical media/wiring similar to communication channel 114 discussed above with reference to FIG. 1A.

Consider for purposes of discussion that user 210 has retained CPE 208 but has solicited new services from the operator or service provider 214. Specifically, for purposes of discussion, suppose that the operator of service provider 214 offers services at a BYOD discount price because user 210 has indicated that they have their "own device." In this case, the device of user 210 is the illicitly retained CPE 208.

As a result of this situation, service provider 102 has lost CPE 208 and the value thereof. Further, service provider 214 has lost the opportunity to charge a higher rate for services that include providing a CPE because user 210 is using illicitly retained CPE 208.

What is needed is a system and method for enabling a service provider to identify gateway devices, wireless access points, and other CPE that are not registered to the service provider's network.

A system and method in accordance with the present disclosure gives a service provider the ability to identify gateway devices, wireless access points, and other CPE that are not registered to the service provider's network.

In accordance with the present disclosure, a management service provider provides a solution to the problem discussed above. It is impractical for service provider 102 to enforce that every user, such as user 110, returns a CPE upon cancellation or termination of service with service provider 102. A system and method in accordance with the present disclosure may configure a CPE to be non-functional, or at least function at a lower level of privileges, if the CPE is used in a manner outside of the specific level of service originally subscribed to by an original user. If a subsequent illicit user cannot activate wireless communication from a CPE, then the motivation for not returning the CPE is decreased, thereby discouraging illicit migration of the CPE.

A management service provider identifies a CPE using device-unique data, maintains an association of the CPE to a service provider with whom the CPE is originally provisioned and maintains an association of the CPE to a user with whom the CPE is originally provisioned. Further, if the CPE migrates to a different person, for example as determined by a MAC address or timing offset, or to a different service provider, the management service provider can create an exception report.

A service provider may generate a blacklist of CPE suspected of unauthorized activity based on devices that have not been returned, but are supposed to be removed from provisioning. When the operator of a service provider determines unauthorized activity of a CPE, the operator of the service provider may instruct the service provider to contact the management service provider, which in turn may deactivate the functionality of the CPE.

For any CPE, there is unique data that may be used to uniquely identify the CPE. Non-limiting examples of such unique data include a serial number and a MAC address.

A unique key may be associated with each CPE. In some embodiments, the unique key is derived from the unique data of the CPE. In some embodiments, the unique data is derived from a combination of the unique data of the CPE and data of the original user of the CPE. Non-limiting examples of data of the original user include name, telephone number, email address, zip code, and combinations thereof.

In other embodiments, a seed may be used to generate a key, wherein the seed is derived from a combination of the unique data of the CPE and data of the original user of the CPE.

In some embodiments, different sets of privileges are assigned to a particular CPE, based on the current user and the current service provider. For example, an original user of a CPE that is receiving original services from an original service provider might have a first level of privileges, e.g., the CPE might support four distinct wireless networks, the CPE might provide a relatively high upload/download speed, and the CPE might have access to a relatively high offsite storage. On the other hand, if the CPE later is submitted for service by a subsequent user, or subsequent service provider, a second level of privileges may be enabled, e.g., the CPE might support only a single wireless network, the CPE might provide a relatively low upload/download speed, and the CPE might have access to a relatively low offsite storage. In some cases, the second set of privileges might be no service, in which case the CPE is unusable, which would drastically discourage illicit migration of the CPE.

Each unique key, or seed to generate a key, associated with a CPE should be stored securely. Storing the key securely includes storing the information in a non-volatile memory that does not get erased through power cycles, storing the information in a manner to last the lifetime of the product, storing the information in a manner resilient to data corruption, and storing the information in an encrypted format.

Further, the stored information should not be cloneable to another CPE. Cloning is a process by which information unique to a CPE, and associated certificates and authorizations, are copied from the flash non-volatile storage to another CPE of the same type and model. This allows for the user of the second CPE to use privileges and authorizations for service by masquerading as the first user. The data of the CPE may be securely stored by any known manner, a non-limiting example of which includes encrypted form that can only be decrypted through a unique per-SoC key.

The advantage with a management service provider in accordance with aspects of the present invention is that it maintains the relationship between the unique data associated with a CPE and an original service provider. So, if a CPE were to show up in the network of a second service provider, either because it is surreptitiously brought in by a user, or because it is identified to the service provider as a BYOD device, but the second service provider cannot identify or does not care whether the device belongs to the first service provider, a management service provider in accordance with aspects of the present invention may still identify the migration.

Further, based on a configuration profile, a management service provider in accordance with aspects of the present invention can act to flag, deactivate, or limit functionality for a CPE. This allows for different types of commercial arrangements that the service provider might engage in with a user. For instance, a service provider might permit sale of the unit, in which case the CPE can retain limited functionality.

Example embodiments for a system and method for preventing unauthorized migration of wireless access points across service providers in accordance with aspects of the present disclosure will now be described in greater detail with reference to FIGS. 3-7C.

Figure 3:
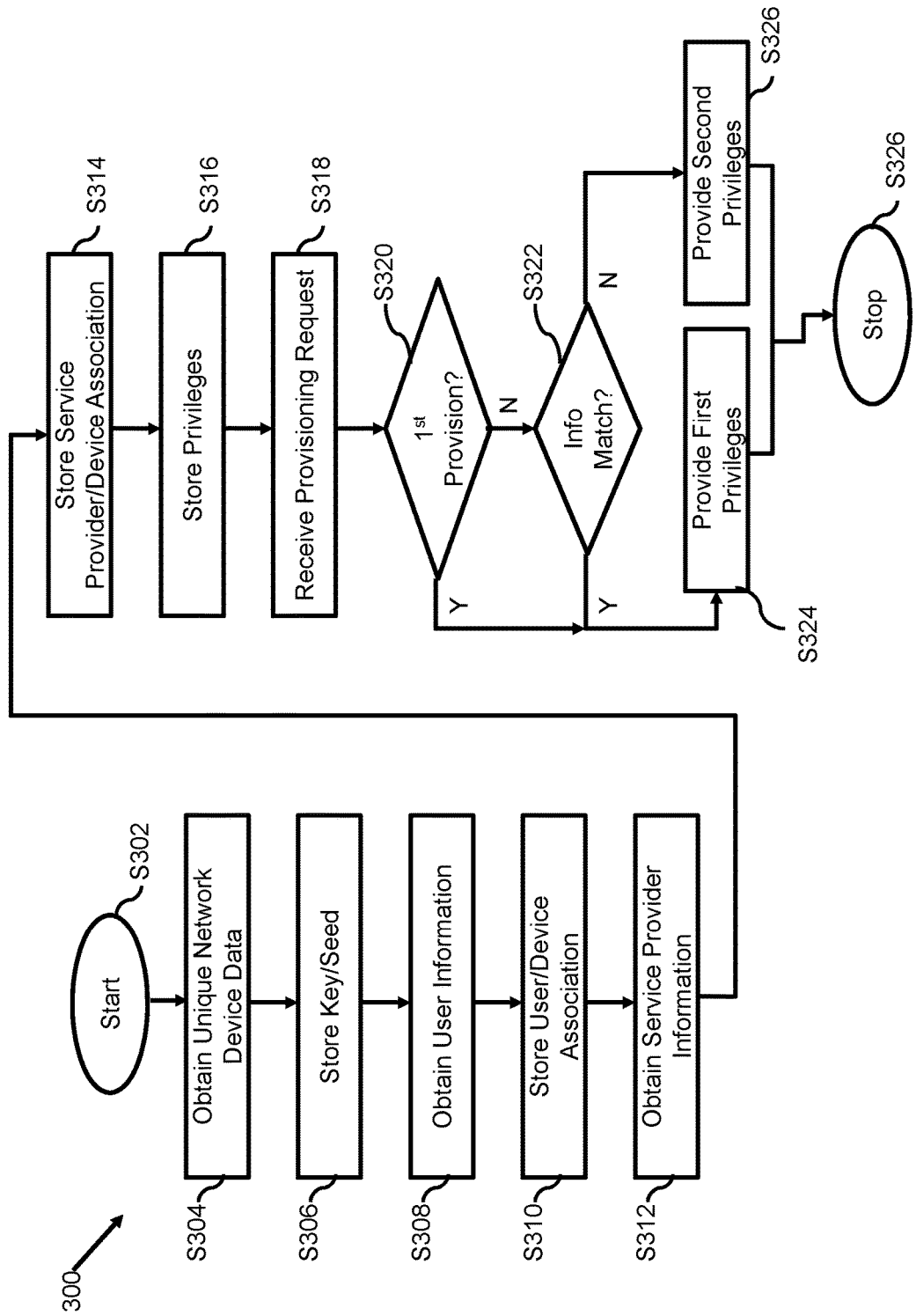
FIG. 3 illustrates an algorithm to be executed by a processor for preventing unauthorized migration of wireless access points across service providers.

FIG. 3 illustrates an algorithm 300 to be executed by a processor for preventing unauthorized migration of a CPE across service providers, in accordance with aspects of the present disclosure.

As shown in the figure, algorithm 300 starts (S302), and unique network device data is obtained (S304). This will be described in greater detail with reference to FIGS. 4A and 5.

A first example of the present disclosure for preventing unauthorized migration of a device of a service provider by illicitly transferring the device to another user will now be described with reference to FIGS. 4A-4C.

Figure 4A:
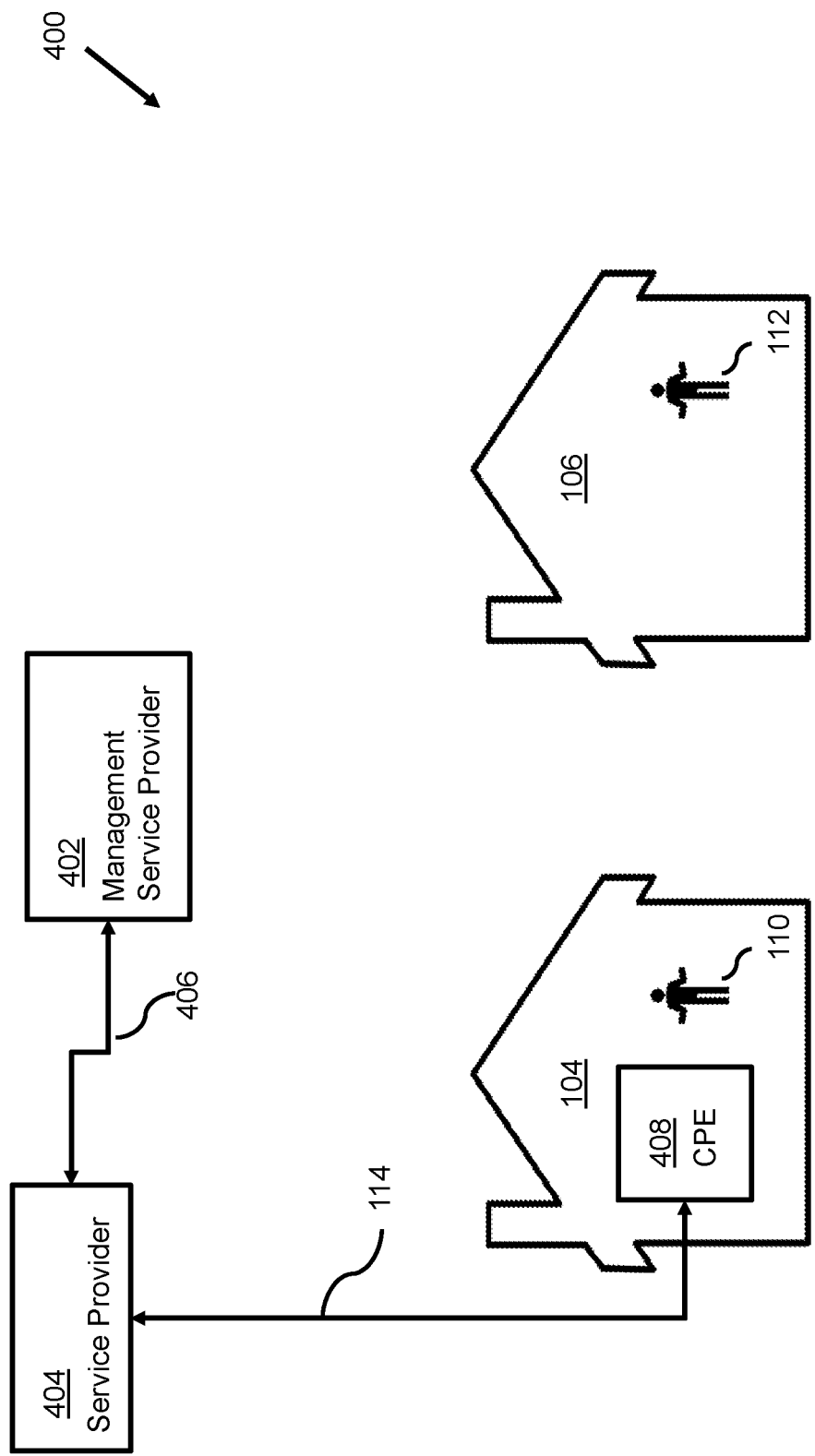
FIG. 4A illustrates a network in accordance with aspects of the present disclosure at a time $t_7$.

FIG. 4A illustrates a network 400 in accordance with aspects of the present disclosure at a time $t_7$.

As shown in the figure, network 400 includes a service provider 404, a service consumer location 104, a service consumer location 106, a communication channel 114, a management service provider 402, and a communication channel 406. Service consumer location 104 includes a CPE 408 and a user 110. Service consumer location 106 includes a user 112.

Service provider 404 is configured to communicate with CPE 408 by way of communication channel 114. Management service provider 402 is configured to communicate with service provider 404 by way of communication channel 406, which may include physical media/wiring.

Figure 5:
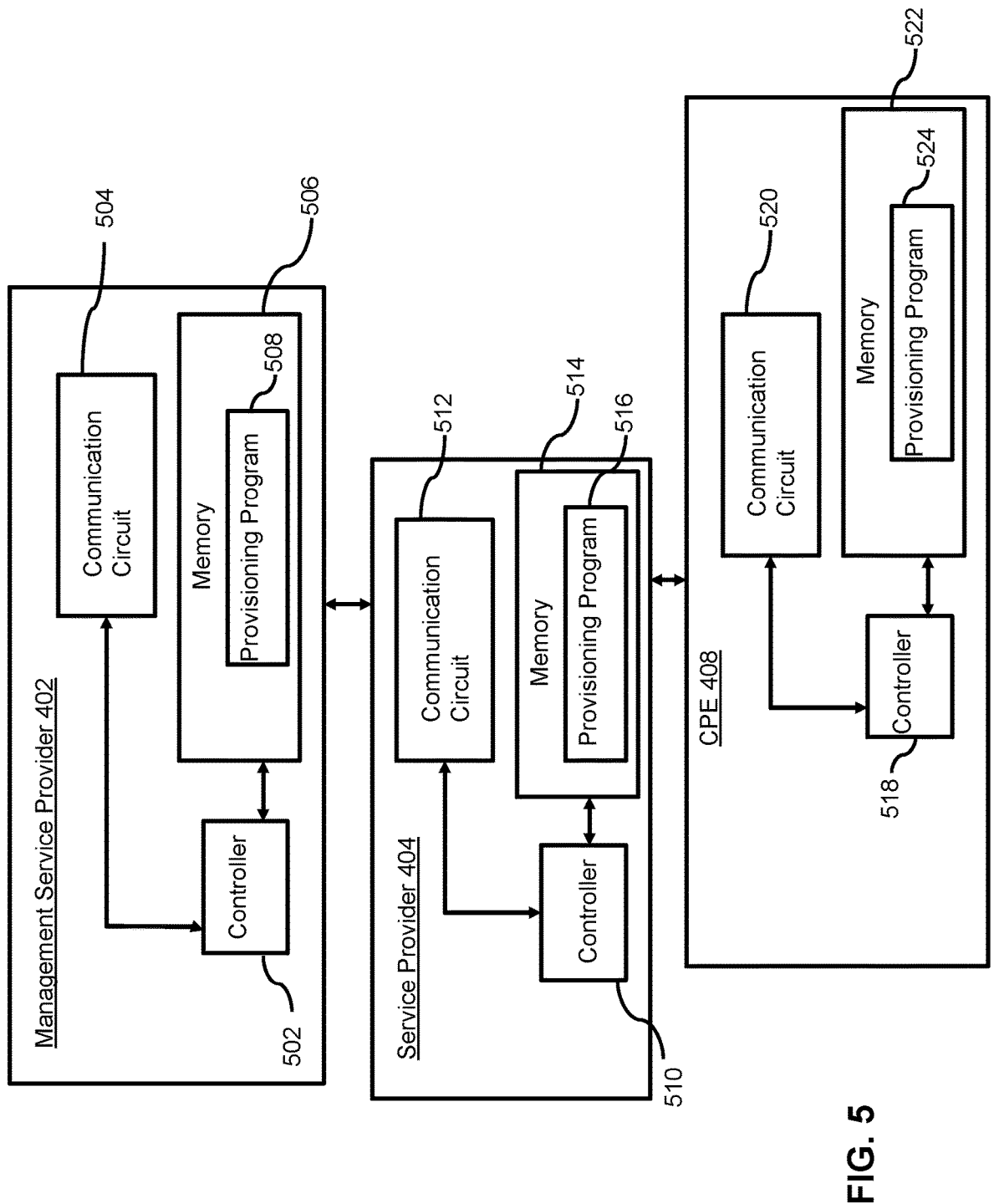
FIG. 5 illustrates an exploded view of the management service provider, the service provider and the customer premises equipment (CPE) of FIG. 4A.

FIG. 5 illustrates an exploded view of management service provider 402, service provider 404, and CPE 408 of FIG. 4A.

As shown in FIG. 5, management service provider 402 includes a controller 502; a memory 506, which has stored therein provisioning program 508; and a communication circuit 504. As will be described in greater detail below, controller 502 is configured to execute program instructions stored in memory 506.

In this example, controller 502, memory 506, and communication circuit 504 are illustrated as individual devices. However, in some embodiments, at least two of controller 502, memory 506, and communication circuit 504 may be combined as a unitary device. Whether as individual devices or as combined devices, controller 502, memory 506, and communication circuit 504 may be implemented as any combination of an apparatus, a system and an integrated circuit. Further, in some embodiments, at least one of controller 502, memory 506, and communication circuit 504 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 502 may be implemented as a memory and a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the circuits of management service provider 402.

Memory 506 can store various programming, and user content, and data including provisioning program 508. In example embodiments, as will be described in greater detail below, provisioning program 508 includes instructions that when executed by controller 502, enable management service provider 402 to cause management service provider 402 to obtain unique data associated with CPE 408; store, into memory 506, at least one of a first key and a first seed, the first key being associated with CPE 408 and being based on the unique data, the first seed being associated with CPE 408, being based on the unique data, and for use to create a second key; obtain user information identifying a user to be associated with CPE 408; store, into memory 506, the association of the user with CPE 408; obtain service provider 404 information identifying service provider 404 to provide service to the user via CPE 408; and store, into memory 506, the association of service provider 404 with CPE 408.

In some embodiments, as will be described in greater detail below, provisioning program 508 includes instructions that when executed by controller 502, enable management service provider 402 to execute instructions stored on memory 506 to additionally cause management service provider 402 to store, into memory 506, a first set of privileges associated with CPE 408 when CPE 408 is associated with the user and CPE 408 is associated with service provider 404.

In some embodiments, as will be described in greater detail below, provisioning program 508 includes instructions that when executed by controller 502, enable management service provider 402 to execute instructions stored on memory 506 to additionally cause management service provider 402 to receive a provisioning request from CPE 408 to provision CPE 408 with a second service provider, which can be either service provider 404 or service provider 702, the provisioning request includes a third key, and provision CPE 408 with the first set of privileges when the third key corresponds to the first key. In some further embodiments controller 502 is further configured to execute instructions stored on memory 506 to additionally cause service provider 404 or service provider 702 to provision CPE 408 with a second set of privileges when the third key does not correspond to the first key.

In some embodiments, as will be described in greater detail below, provisioning program 508 includes instructions that when executed by controller 502, enable management service provider 402 to execute instructions stored on memory 506 to additionally cause management service provider 402 to store, into memory 506, the first seed, create the second key using the first seed; receive a provisioning request from CPE 408 to provision CPE 408 with service provider 404 or service provider 702, the provisioning request includes a third key, and provision the network device with the first set of privileges when the third key corresponds to the second key. In some further embodiments the processor is further configured to execute instructions stored on memory 506 to additionally cause service provider 404 or service provider 702 to provision CPE 408 with a second set of privileges when the third key does not correspond to the second key.

In some embodiments, as will be described in greater detail below, provisioning program 508 includes instructions that when executed by controller 502, enable management service provider 402 to execute instructions stored on memory 506 to additionally cause management service provider 402 to obtain the unique data associated with CPE 408 as a first media access control (MAC) address of CPE 408, receive a provisioning request from CPE 408 to provision CPE 408 with service provider 404 or service provider 702, the provisioning request includes a second MAC address of CPE 408, and provision CPE 408 with the first set of privileges when the first MAC address corresponds to the second MAC address. In some further embodiments controller 502 is further configured to execute instructions stored on memory 506 to additionally cause service provider 404 or service provider 702 to provision CPE 408 with a second set of privileges when the first MAC address does not correspond to the second MAC address.

In some embodiments, as will be described in greater detail below, provisioning program 508 includes instructions that when executed by controller 502, enable management service provider 402 to execute instructions stored on memory 506 to additionally cause management service provider 402 to receive a provisioning request from CPE 408 to provision CPE 408 with service provider 404 or service provider 702, the provisioning request includes service provider information identifying which of service provider 404 or service provider 702 will provide service to user 110 via CPE 408, and provision CPE 408 with the first set of privileges when service provider 404 remains the service provider. In some further embodiments controller 502 is further configured to execute instructions stored on memory 506 to additionally cause management service provider 402 to provision CPE 408 with a second set of privileges when service provider 408 does not remain the service provider.

Communication circuit 504 can include one or more connectors, such as RF connectors, Ethernet connectors, and/or wireless communication circuitry, such as 5G circuitry and one or more antennas. Communication circuit 504 receives content from service provider 404 by known methods, non-limiting examples of which include terrestrial antenna, satellite dish, wired cable, DSL, optical fibers, or 5G as discussed above. Through communication circuit 504, management service provider 402 receives an input signal, including data and/or audio/video content, from service provider 404 and can send data to service provider 404.

Insofar as management service provider 502 provides connection to service provider 404, management service provider 502 can be equipped with connectors to connect with a television or display device, and can also include programming to execute an electronic program guide and/or other suitable graphical user interface (GUI).

Service provider 404 includes a controller 510, a memory 514, which has stored therein provisioning program 516, and a communication circuit 512. As will be described in greater detail below, controller 510 is configured to execute program instructions stored in memory 514.

In this example, controller 510, memory 514, and communication circuit 512 are illustrated as individual devices. However, in some embodiments, at least two of controller 510, memory 514, and communication circuit 512 may be combined as a unitary device. Whether as individual devices or as combined devices, controller 510, memory 514, and communication circuit 512 may be implemented as any combination of an apparatus, a system and an integrated circuit. Further, in some embodiments, at least one of controller 510, memory 514, and communication circuit 512 may be implemented as a computer having non-transitory computer-readable media for carrying or having computer-executable instructions or data structures stored thereon.

Controller 510 may be implemented as a memory and a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the circuits of service provider 404.

Memory 514 can store various programming, and user content, and data including provisioning program 516. In example embodiments, as will be described in greater detail below, provisioning program 516 includes instructions that when executed by controller 510, enable service provider 404 to cause service provider 404 to obtain information from CPE 408, pass the information along to management service provider 402, and contact management service provider 402 if in the future CPE 408 attempts to reconnect with service provider 404.

CPE 408 includes a controller 518, a memory 522, which has stored therein provisioning program 524, and a communication circuit 520. As will be described in greater detail below, controller 518 is configured to execute program instructions stored in memory 522.

In this example, controller 518, memory 522, and communication circuit 520 are illustrated as individual devices. However, in some embodiments, at least two of controller 518, memory 522, and communication circuit 520 may be combined as a unitary device. Whether as individual devices or as combined devices, controller 518, memory 522, and communication circuit 520 may be implemented as any combination of an apparatus, a system, and an integrated circuit. Further, in some embodiments, at least one of controller 518, memory 522, and communication circuit 512 may be implemented as a computer having non-transitory computer-readable media for carrying or having computer-executable instructions or data structures stored thereon.

Controller 518 may be implemented as a memory and a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the circuits of CPE 408.

Memory 522 can store various programming, user content, and data including provisioning program 524. In example embodiments, as will be described in greater detail below, provisioning program 524 includes instructions that when executed by controller 518, enable CPE 404 to cause CPE 404 to obtain information from memory 522, pass the information along to service provider 404, and contact service provider 404 if in the future CPE 408 attempts to reconnect with service provider 404.

In operation controller 510 executes instructions in provisioning program 516 so as to instruct communication circuit 512 to request unique data from CPE 408. Communication circuit 512 then requests unique data from CPE 408 via communication channel 114. Communication circuit 520 receives and forwards the request for unique data to controller 518. Executing instructions from provisioning program 524, controller 518 obtains unique data of CPE 408 from memory 522. In a non-limiting example embodiment, the unique data of CPE 408 includes a serial number of CPE 408 and a media access control (MAC) address as stored in memory 522.

Upon executing instructions from provisioning program 524, controller 518 then instructs communication circuit 520 to transmit the unique data of CPE 408 to service provider 404. Communication circuit 520 then transmits the unique data of CPE 408 to communication circuit 512 of service provider 404 via communication channel 114.

Executing instructions from provisioning program 516, controller 510 then instructs communication circuit 512 to transmit the unique data of CPE 408 to management service provider 402. Communication circuit 512 then transmits the unique data of CPE 408 to communication circuit 504 of management service provider 402 via communication channel 406. Executing instructions from provisioning program 508, controller 502 then stores the unique data of CPE 408 in memory 506.

Returning to FIG. 3, after unique CPE data has been obtained (S304), a key and/or a seed is stored (S306). For example, in some embodiments, as shown in FIG. 5, in management service provider 402, provisioning program 508 includes instructions that when executed by controller 502, enable management service provider 402 to cause management service provider 402 to store a first key into memory 506. The first key is associated with CPE 408 and is based on the unique data of CPE 408.

In other embodiments, provisioning program 508 includes instructions that when executed by controller 502, enable management service provider 402 to cause management service provider 402 to store a seed into memory 506. The seed is part of a seed-key security protocol, wherein a known algorithm is used to generate a key based on the seed. In embodiments where provisioning program 516 of service provider 404 uses a seed, provisioning program 516 of service provider 404, provisioning program 524 of CPE 408 and provisioning program 508 of management service provider 402 may include the algorithm used to generate a key based on the provided seed. By using a seed-key security protocol, in the event that the seed is maliciously intercepted or duplicated by a third party, the corresponding key cannot be recreated without the known algorithm.

Returning to FIG. 3, after a key and/or a seed has been stored (S306), user information is obtained (S308). For example, as shown in FIG. 5, provisioning program 508 includes instructions that when executed by controller 502, enable management service provider 402 to cause management service provider 402 to obtain user information identifying a user to be associated with CPE 408.

In an example embodiment, the information of user 110 may be provided to an operator of service provider 404. This information may be obtained for example when user 110 executes a sales contract and accepts delivery of CPE 408, or when user 110 attempts to initialize CPE 408 (start service). Such information may include name, address, email address, phone number or combination thereof of user 110. As shown in FIG. 5, service provider 404 may store such information of user 110 in memory 514.

Returning to FIG. 3, after user information has been obtained (S308), an association of a user to a device is stored (S310). For example, as shown in FIG. 5, provisioning program 508 includes instructions that when executed by controller 502, enable management service provider 402 to store into memory 506 the association of the user with CPE 408.

In an example embodiment, controller 510 of service provider 404 executes instructions in provisioning program 516 to associate user 110, via the information of the user discussed above (S308), with CPE 408, via the unique data obtained as discussed above (S304). This association is stored in memory 506.

Returning to FIG. 3, after an association of a user to a device has been stored (S310), service provider information is obtained (S312). For example, as shown in FIG. 5, provisioning program 516 of service provider 404 includes instructions that when executed by controller 510, enable service provider 404 to associate service provider information identifying service provider 404 to user 110 and to CPE 408.

Returning to FIG. 3, after service provider information has been obtained (S312), an association of a service provider to a device is stored (S314). For example, as shown in FIG. 5, provisioning program 516 includes instructions that when executed by controller 510, enable service provider 404 to store into memory 514 the service provider information.

Returning to FIG. 3, after an association of a service provider to a device has been stored (S314), privileges are stored (S316).

For example, an operator of service provider 404 may assign privileges to CPE 408 when user 110 signs an initial contract for services. These privileges may, without limitation, include enabling CPE 408 to support n distinct wireless networks, enabling CPE 408 to provide a relatively high upload/download speed, and enabling CPE 408 to have access to a relatively high offsite storage. As shown in FIG. 5, provisioning program 516 includes instructions that when executed by controller 510, enable service provider 404 to store into memory 514 these privileges. These privileges are afforded to CPE 408 when used by user 110 and when receiving services from service provider 404.

Further, an operator of service provider 404 may assign a second set of privileges to CPE 408. These privileges may include, without limitation, enabling CPE 408 to support less than n distinct wireless networks, enabling CPE 408 to provide a relatively low upload/download speed, and enabling CPE 408 to have access to a relatively low offsite storage. As shown in FIG. 5, provisioning program 516 includes instructions that when executed by controller 510, enable service provider 404 to store into memory 514 these second privileges. These second privileges may enabled for CPE 408 when not used by user 110, when receiving services from a service provider other than service provider 404, and combinations thereof. In some embodiments, these second privileges may include totally disabling operation of CPE 408. In such a case, CPE 408 would be unusable, which would drastically discourage illicit migration of CPE 408.

Service provider 404 now has obtained the unique device data of CPE 408 (S304), has a key or seed (S306), has user information of user 110 (S308), has stored an association between CPE 408 and user 110 (S310), has service provider information of service provider 404 (312), has stored an association between service provider 404 and CPE 408 (S314), has stored privileges of CPE 408 (S316). This data may be provided to management service provider 402. This will be described in greater detail with reference to FIG. 6A.

Figure 6A:
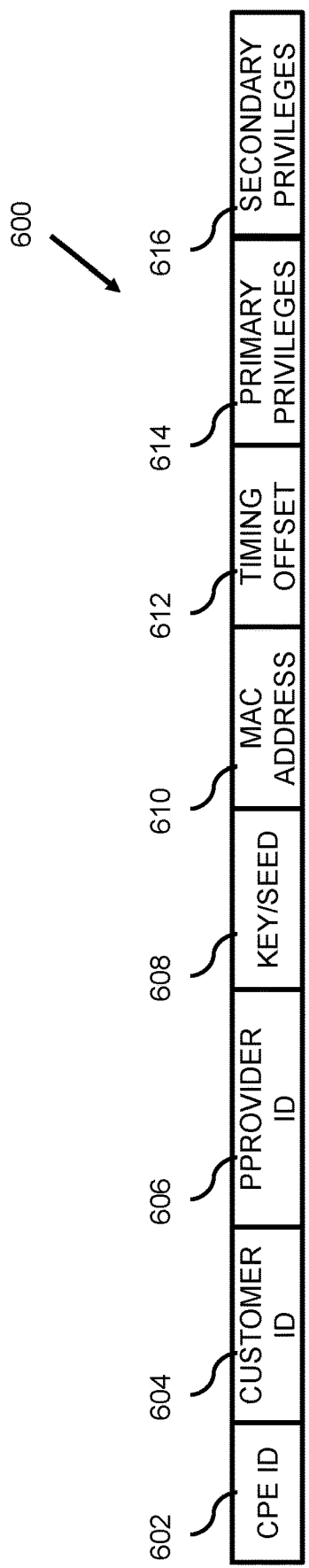
FIG. 6A illustrates a sample data structure managed in the management service provider of FIG. 5.

FIG. 6A illustrates a sample data payload 600 associated with CPE 408, and managed in management service provider 402 in accordance with aspects of the present disclosure.

In this non-limiting example, data payload 600 represents a payload for a communication packet that is formatted in a communication standard implemented by service provider 404. Data payload 600 is a portion of a communication packet that will be transmitted from service provider 404 to management service provider 402 using communication channel 406.

As shown in the figure, data payload 600 includes a plurality of data fields, including CPE ID field 602, customer ID field 604, provider ID field 606, key/seed field 608, MAC address field 610, timing offset field 612, primary privileges field 614, and secondary privileges field 616.

CPE ID field 602 identifies CPE 408 based on the obtained unique network device data, as discussed above (S304). Customer ID field 604 is a string of bits identifying the customer that owns CPE 408 based on the obtained user data, as discussed above (S308). Provider ID field 606 is a string of bits identifying service provider 404, as discussed above (S312). Key/seed field 608 is a string of bits identifying either the key or the seed associated with communicating with CPE 408 as discussed above (S306). MAC address field 610 is a string of bits identifying the MAC address of CPE 408, as discussed above (S308). Timing offset field 612 is a string of bits identifying any offset in response time between the service provider 404 and CPE 408, as discussed above (S308). Primary privileges field 614 is a string of bits identifying a first set of privileges afforded to CPE 408 when used by user 110 and when receiving services from service provider 404, as discussed above (S316). Secondary privileges 616 field is a string of bits identifying privileges afforded to CPE 408 when not used by user 110, when receiving services from a service provider other than service provider 404, and combinations thereof, as discussed above (S316).

As shown in FIG. 5, controller 510 of service provider 404 instructs communication circuit 512 to transmit a data packet having data payload 600 to management service provider 402. Upon receipt by communication circuit 504, controller 502 of management service provider 402 stores the information within data payload 600 in memory 506.

In the non-limiting example embodiment discussed above, service provider 404 collects all the information within payload 600 and provides the information within payload 600 to management service provider 402. However, in other embodiments, management service provider 402 may request the information, either singly or in combination, from service provider 404. In response to such a request, service provider 404 may provide the information, either singly or in combination, to management service provider 402.

At this point, management service provider 402 has information that associates CPE 408 to user 110 and that associates CPE 408 to service provider 404. It should be noted that management service provider 402 may store similar data that associates a plurality of other CPE to a plurality of respective users and that associates the plurality of other CPE to a plurality of respective service providers.

Now consider the situation service provider 404 terminates providing services to CPE 408. This will be described in greater detail with reference to FIG. 4B.

Figure 4B:
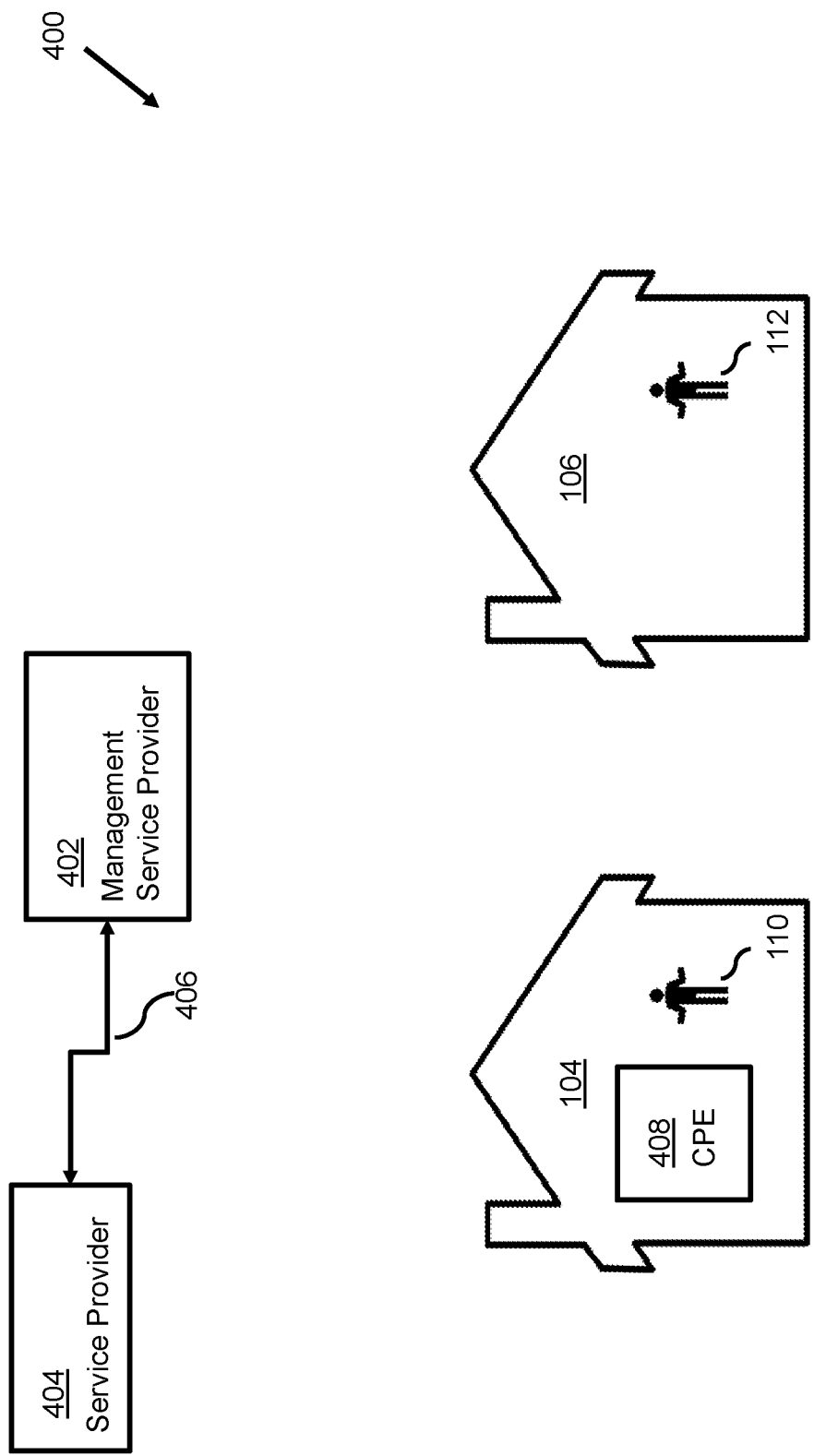
FIG. 4B illustrates the network of FIG. 4A at a time $t_8$.

FIG. 4B illustrates network 400 at a time $t_8$.

As shown in FIG. 4B, service provider 404 has terminated providing service to CPE 408. This may be as a result of a termination of time defined in the initial contract agreement for services between the operator of service provider 404 and user 110 or because there was breach in the agreement, e.g., user 110 stopped making the monthly payments to the operator of service provider 404. At this point, suppose that in accordance with the service agreement, user 110 is required to return CPE 408 to service provider 404. However, in this case, user 110 does not return CPE 408 to service provider 404. On the contrary, suppose that user 110 sells CPE 408 to a neighbor, wherein the neighbor will attempt to receive services from service provider 404.

Returning to FIG. 3, after privileges have been stored (S316), a provisioning request is received (S318). This will be described with additional reference to FIG. 4C.

Figure 4C:
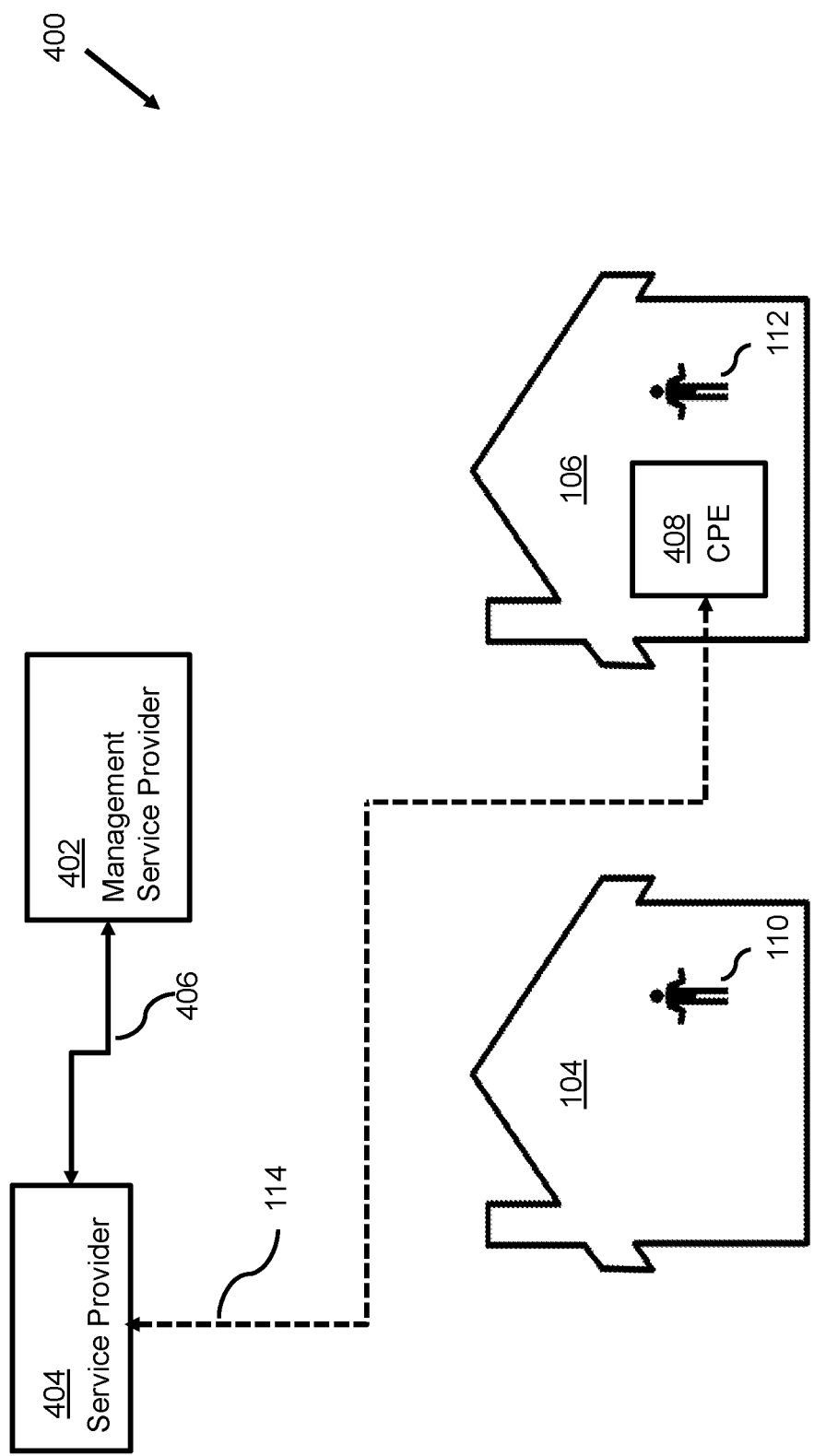
FIG. 4C illustrates the network of FIG. 4A at a time $t_9$.

FIG. 4C illustrates network 400 at a time $t_9$.

As shown in FIG. 4C, similar to the situation discussed above with reference to FIG. 1C, user 110 has sold CPE 408 to a neighbor, user 112, wherein the neighbor will attempt to receive services from service provider 404, Specifically, suppose that the operator of service provider 404 offers services at a discount price if the operator of service provider 404 does not have to provide a CPE. In other words, the operator of service provider offers a BYOD discount. In this example, suppose that the operator of service provider 402 has offered user 112 the same level of service that was offered to user 110, but at a discount BYOD monthly service charge because user 112 has indicated that they have their "own device." In this case, the device of user 112 is the illicitly transferred CPE 408.

In this situation, user 112 first initiates a provisioning request from CPE 408 to service provider 404, to start service. During the initiation sequence, service provider 404 with obtain from CPE 408: the unique network device data in a manner as discussed above (S304); the identification of customer 112 that now allegedly owns CPE 408 based on the obtained user data in a manner as discussed above (S308); the service provider information of service provider 404 in a manner as discussed above (S312); the key or the seed associated with communicating with CPE 408 in a manner as discussed above (S306); the MAC address of CPE 408 in a manner as discussed above (S308); the offset in response time between the service provider 404 and the CPE 408 in a manner as discussed above (S308); the first set of privileges afforded to CPE 408 when used by user 112 and when receiving services from service provider 404 in a manner as discussed above (S316); and the privileges afforded to CPE 408 when not used by user 112, when receiving services from a service provider other than service provider 404, and combinations thereof, as discussed above (S316).

Figure 6B:
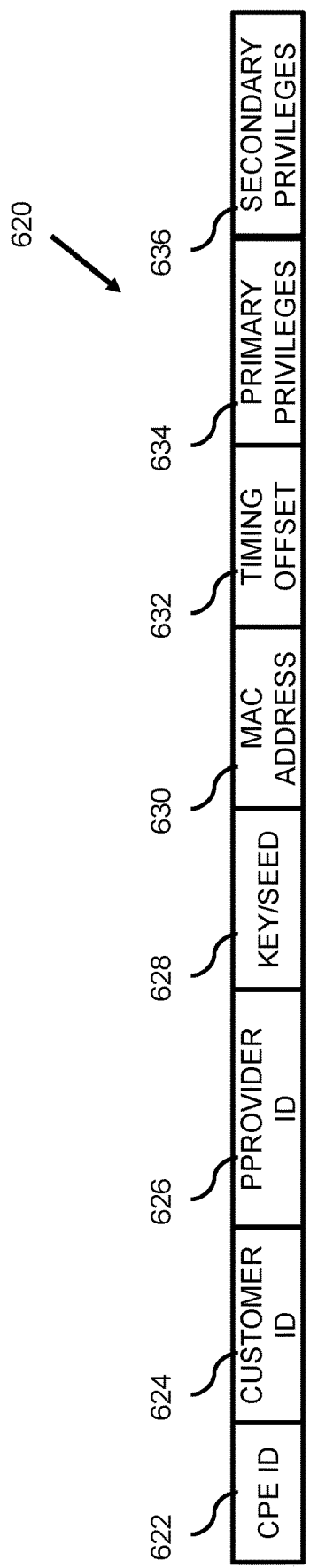
FIG. 6B illustrates another sample data structure managed in the management service provider of FIG. 5.

FIG. 6B illustrates a sample data payload 620 associated with CPE 408 as proffered for service by user 112 at time $t_9$.

In this non-limiting example, data payload 620 represents a payload for a communication packet that is formatted in a communication standard implemented by service provider 404. Data payload 620 is a portion of a communication packet that will be transmitted from service provider 404 to management service provider 402 using communication channel 406.

As shown in the figure, data payload 620 includes a plurality of data fields, including CPE ID field 622, customer ID field 624, provider ID field 626, key/seed field 628, MAC address field 630, timing offset field 632, primary privileges field 634, and secondary privileges field 636. These data fields correspond to the data fields, respectively, as discussed above with reference to FIG. 6A. However, the data within data payload 620 of FIG. 6B differs from the data within payload 600 of FIG. 6A.

In particular, data within customer ID field 624 of data payload 620 corresponds to customer 112, whereas data within customer ID field 604 of data payload 600 corresponds to customer 102. Therefore, the data within these fields will differ.

Similarly, data within MAC address field 630 of data payload 620 corresponds to consumer location 106, whereas data within MAC address field 610 of data payload 600 corresponds to consumer location 104. Therefore, the data within these fields will differ.

Further, suppose for purposes of discussion that consumer location 106 is substantially distant, e.g., on the order of tens of miles, from consumer location 104. In such a case data within timing offset field 632 of data payload 620 corresponds to consumer location 106, whereas data within timing offset field 612 of data payload 600 corresponds to consumer location 104. Therefore, the data within these fields will differ.

Returning to FIG. 5, controller 510 of service provider 404 uses the information of CPE 408 from user 112 to create a communication packet with data payload 620 and provides the communication packet to management service provider 402.

Returning to FIG. 3, after a provisioning request has been received (S318), it is determined whether this is the first provisioning of the CPE (S320). For example, as shown in FIG. 5, provisioning program 508 includes instructions that when executed by controller 502, enable management service provider 402 to review the data within data payload 600 or data payload 620.

Upon review, controller 502 may search memory 506 for any previously stored data payloads having data within a CPE ID field that matches the data within the CPE ID field of the most recently received payload.

Returning to FIG. 3, if it is determined that this is the first provisioning of the CPE (Y at S320), then the first set of privileges are provided (S322). Returning to FIG. 5, controller 502 of management service provider 402 instructs communication circuit 504 to transmit a first provisioning signal to service provider 404. The first provisioning signal indicates that the communication packet most recently received by management service provider 402 corresponds to a CPE that is not registered within memory 506 of management service provider 402 and therefore corresponds to a CPE that is being provisioned for a first time. Upon receipt, communication circuit 512 of service provider 404 provides the first provisioning signal to controller 510.

Controller 510 of service provider 404 then identifies the first set of privileges corresponding to the bits within the primary privileges field corresponding to the CPE requesting provisioning. Service provider 404 would then provision the CPE in accordance with the first set of privileges.

Returning to FIG. 3, after the CPE is provisioned with the first set of privileges, algorithm 300 stops (S326). However, if it is determined that the requested provisioning of a CPE is not the first provisioning of the CPE (N at S320), then it is determined whether the data within a data payload matches (S322). The data within the data payload may match if, for example, a user has lost power or connection from service provider 404. For example, returning to FIG. 4A, suppose that consumer location 104 loses power and CPE 408 is disconnected from service provider 404. In such a situation, when power is restored to consumer location 104, CPE 408 may again request provisioning of service from service provider 404. When all the data is collected, a data payload will match the data payload as shown in FIG. 6A, because all the information is the same.

If it is determined that the data within data payload matches that which was previously recorded for the CPE (Y at S320) then the first set of privileges are provided (S322) and algorithm stops (S326). However, if it is determined that the data within data payload does not match that which was previously recorded for the CPE (N at S320) then the second set of privileges are provided (S324).

For example, returning to FIG. 4C, CPE 408 is in a new location, consumer location 106, with a new user, user 112. As discussed above with reference to FIGS. 6A-B, the data within payload 600 does not match the data within payload 620, even though both payloads correspond to CPE 408, as defined by CPE ID field 602 of payload 600 and CPE ID field 622 of payload 620. In particular, as discussed above: data within customer ID field 624 of data payload 620 corresponds to customer 112, which differs from data within customer ID field 604 of data payload 600 corresponds to customer 102; data within MAC address field 630 of data payload 620 corresponds to consumer location 106, which differs from data within MAC address field 610 of data payload 600 corresponds to consumer location 104; and data within timing offset field 632 of data payload 620 corresponds to consumer location 106, which differs from data within timing offset field 612 of data payload 600, which corresponds to consumer location 104.

Returning to FIG. 5, controller 502 of management service provider 402 therefore instructs communication circuit 504 to transmit a second privileges provisioning signal to service provider 404. The second privileges provisioning signal indicates that the communication packet most recently received by management service provider 402 corresponds to a CPE that is registered within memory 506 of management service provider 402 and therefore corresponds to a CPE that is being provisioned by either another user or that was previously provisioned by another service provider. Upon receipt, communication circuit 512 of service provider 404 provides the second privileges provisioning signal to controller 510.

Controller 510 of service provider 404 then identifies the second set of privileges corresponding to the bits within the secondary privileges field corresponding to CPE 408 in FIG. 4C. Service provider 404 would then provision CPE 408 in accordance with the second set of privileges. As noted above, this second set of privileges might be no service, in which case CPE 408 is unusable by user 112.

Returning to FIG. 3, after the second set of privileges are provisioned (S324), algorithm 300 stops.

In the non-limiting example discussed above with reference to FIGS. 4A-C, management service provider 402 is able to prevent unauthorized migration of CPE 408, wherein user 110 has illicitly transferred CPE 408 to user 112. However, management service provider 402 is additionally able to prevent unauthorized migration of CPE 408, wherein user 110 has illicitly attempted to procure services from another service provider under a BYOD offering. This will be described in greater detail with reference to FIGS. 7A-C.

FIG. 7A illustrates a network 700 in accordance with aspects of the present disclosure at a time $t_{10}$.

As shown in the figure, network 700 includes service provider 702, service consumer location 204, communication channel 212, management service provider 402, and communication channel 406. Service consumer location 204 includes a CPE 708 and user 210.

Service provider 702 is configured to communicate with CPE 708 by way of communication channel 212. Management service provider 402 is configured to communicate with service provider 702 by way of communication channel 406.

In this non-limiting example embodiment discussed above, service provider 702 provides the information within a payload to management service provider 402. At this point, management service provider 402 has information that associates CPE 708 to user 210 and that associates CPE 708 to service provider 702. It should be noted that management service provider 402 may store similar data that associates a plurality of other CPE to a plurality of respective users, and that associates the plurality of other CPE to a plurality of respective service providers.

Figure 7B:
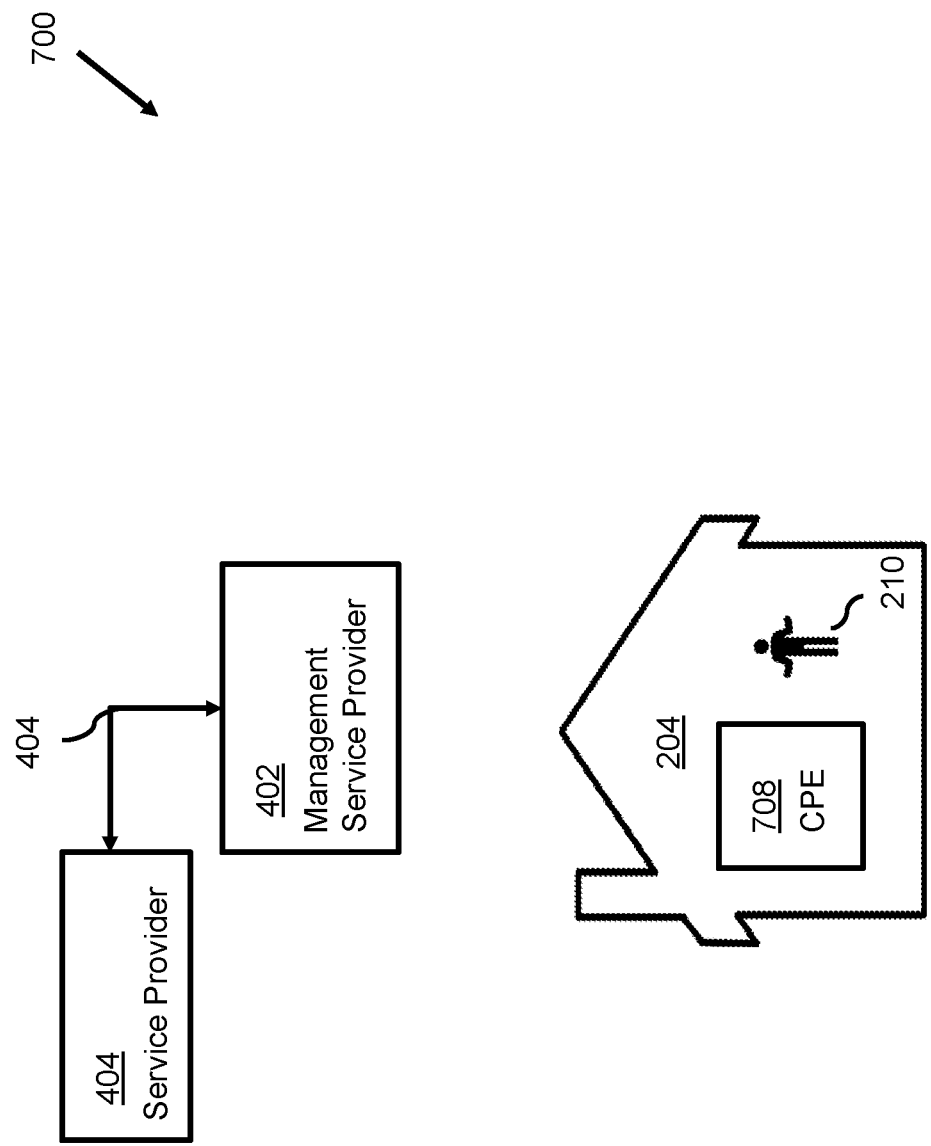
FIG. 7B illustrates the network of FIG. 7A at a time $t_{11}$.

FIG. 7B illustrates network 700 at a time $t_{11}$.

As shown in FIG. 7B, service provider 702 is configured to cease communication with CPE 708.

As shown in FIG. 7B, service provider 702 has terminated providing service to CPE 708. This may be as a result of a termination of time defined in the initial contract agreement for services between the operator of service provider 702 and user 210, or because there was breach in the agreement, e.g., user 210 stopped making the monthly payments to the operator of service provider 702. At this point, suppose that in accordance with the service agreement, user 210 is required to return CPE 708 to service provider 702. However, in this case, user 210 does not return CPE 708 to service provider 702. On the contrary, suppose that user 210 attempts to procure less expensive BYOD services from another service provider.

Figure 7C:
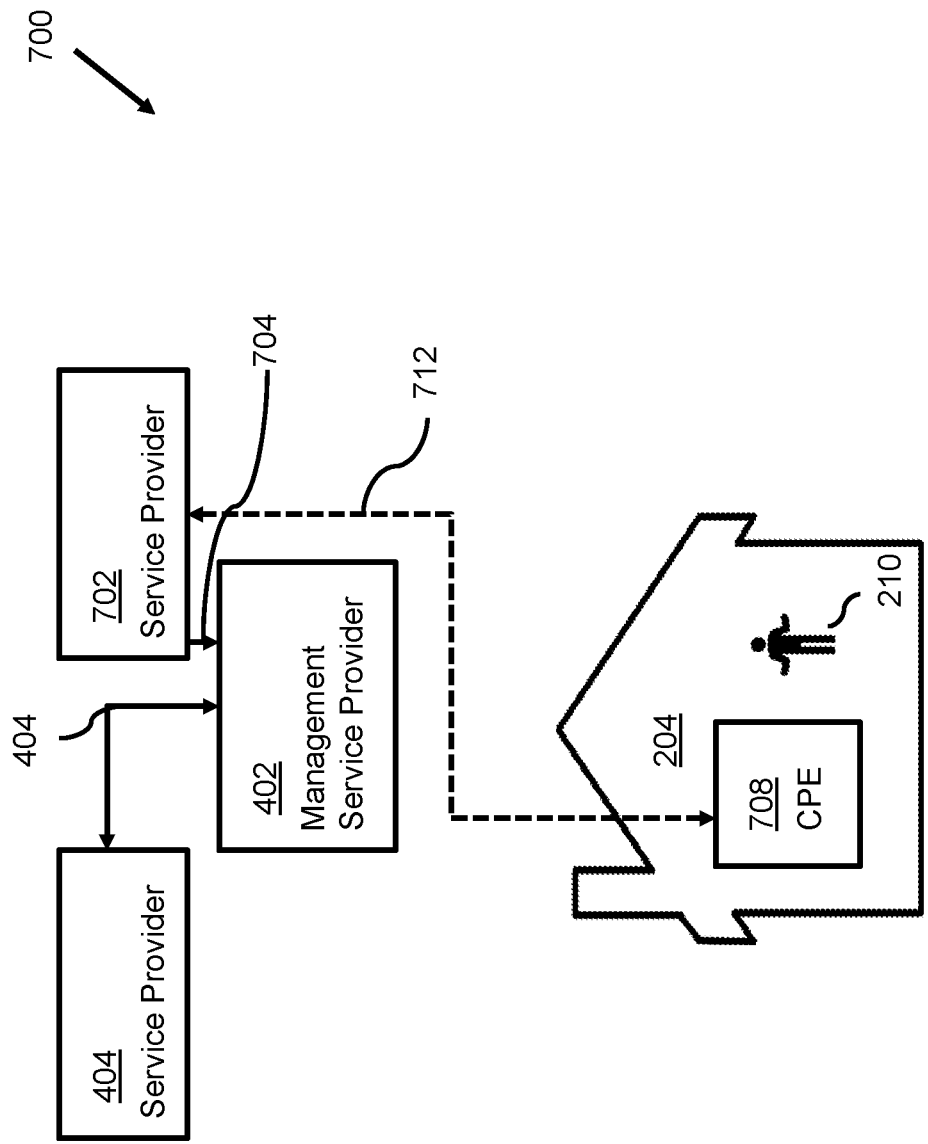
FIG. 7C illustrates the network of FIG. 7A at a time $t_{12}$.

FIG. 7C illustrates network 700 of FIG. 7A at a time $t_{12}$.

As shown in FIG. 7C, network 700 further includes service provider 714, a communication channel 712, and a communication channel 704.

Service provider 714 is configured to communicate with CPE 708 by way of communication channel 712. Management service provider 402 is configured to communicate with service provider 714 by way of communication channel 704.

Suppose that the operator of service provider 714 offers services at a BYOD discount. In this example, suppose that the operator of service provider 714 has offered user 210 the same level of service that was offered to user 210 by service provider 702, but at a discount BYOD monthly service charge because user 210 has indicated that they have their "own device." In this case, the device of user 210 is the illicitly retained CPE 708.

Similar to the situation discussed above with reference to FIG. 4C, in the present situation, management service provider 402 will determine that the data within data payload does not match that which was previously recorded for CPE 708.

For example, CPE 708 had previously been provisioned by service provider 702. In a manner similar to that discussed above with reference to FIGS. 6A-B, the data within the payload for a current request for provisioning will not match data within a payload from a previous request for provisioning from CPE 708. In particular, the most current provisioning request is based on a service provisioning from service provider 714, whereas a previous request for provisioning from CPE 708 was based on provisioning from service provider 702, as discussed above with reference to FIG. 7A. Therefore, as discussed above: data within the provider ID field of the most current request for provisioning from CPE 708 (as shown in FIG. 7C) would differ from data within provider ID field of a previous request for provisioning from CPE 708 (as shown in FIG. 7A).

Returning to FIG. 5, controller 502 of management service provider 402 therefore instructs communication circuit 504 to transmit a second privileges provisioning signal to service provider 714. The second privileges provisioning signal indicates that the communication packet most recently received by management service provider 714 corresponds to a CPE that is registered within memory 506 of management service provider 402, and therefore corresponds to a CPE that, in this case, was previously provisioned by another service provider. Upon receipt, service provider 714 would then provision CPE 708 in accordance with the second set of privileges. As noted above, this second set of privileges might be no service, in which case CPE 708 is unusable by user 210.

In the non-limiting example discussed above with reference to FIGS. 7A-C, management service provider 402 is able to prevent unauthorized migration of CPE 708, wherein user 210 has illicitly retained CPE 708 and sought services from another service provider under a BYOD service offering. However, management service provider 402 is additionally able to prevent unauthorized migration of CPE 708, by way of cloning.

In particular, data within a Key/Seed data field, as discussed above with reference to FIG. 6A, is secure and is generated based on a first user and a first provisioning service provider. Any attempts to clone a CPE will fail as the data required for the Key/Seed data field will not be accessible or creatable.

As discussed above, conventional systems for providing services to CPEs are plagued with unauthorized migration of CPEs.

A management service provider in accordance with aspects of the present disclosure registers newly provisioned CPEs, by associating each CPE with a respective original user and an original service provider. Any subsequent attempt to illicitly migrate a registered CPE will be recognized, wherein a second (lesser) set of privileges may be provided to the CPE.

The processes disclosed above constitute algorithms that can be effected by software, applications (apps, or mobile apps), or computer programs. The software, applications, or computer programs can be stored on a non-transitory computer-readable medium for causing a computer, such as the one or more processors, to execute the processes described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A server device for use with a network device, said server device comprising:
   a memory; and
   a processor configured to execute instructions stored on said memory to cause said server device to:
   communicate by way of a first communication channel with a first internet service provider that is configured to communicate with the network device by way of a second communication channel,
   obtain, from the first service provider, unique data that identifies the network device, the unique data comprises a serial number,
   obtain, from the first internet service provider, user information identifying an original user to be associated with the network device,
   obtain service provider information, from the first internet service provider, identifying the first internet service provider to provide service to the original user via the network device,
   store, into said memory, the unique data, the user information, the service provider information and a first key the first key being associated with the network device and generated using the unique data and data of the original user of the network device, wherein the data of the original user of the network device includes name, telephone number, email address, zip code and combinations thereof of the original user, and the first key is used to create a second key, wherein all information stored associated with the network device is not cloneable to another network device,
   subsequent to storing the unique data, the user information, the service provider information and the first key into the memory, receive a communication packet with a data payload from the first internet service provider associated with the network device to request provisioning of the network device, wherein the data payload comprises a field that identifies a unique identifier of the network device, a provider identifier (ID), a customer identifier (ID), a primary privileges field, a secondary privileges field and a key, wherein the primary privileges field identifies a first one or more privileges afforded to the network device when used by the original user and when receiving first one or more services from the first internet service provider, and the secondary privileges field identifies a second one or more privileges afforded to the network device when not used by the original user and when receiving one or more second services from a second internet service provider, wherein the first and second internet service providers are different internet service providers,
   in response to receiving the request for provisioning of the network device, determine that the network device has been provisioned previously and that service provided to the network device by the first internet service provider was terminated, compare:
   a) the unique data stored to the unique identifier of the network device in the data payload,
   b) the service provider information stored with the provider ID in the data payload
   c) the user information stored with the user ID in the data payload, and d) the first key stored with the key in the data payload, when a match is determined for all information from steps a-d, provision the network device with the one or more privileges from the first internet service provider indicated in the data payload, when at least one of the steps a-d does not result in a match, prevent unauthorized migration of the network device by provisioning the network device with the one or more privileges from the second internet service provider indicated in the data payload.

2. The server device of claim 1, wherein the processor is further configured to execute the instructions stored on said memory to additionally cause said server device to:

store, into said memory, the first one or more privileges associated with the network device when the network device is associated with the original user and the network device is associated with the first internet service provider.

3. The server device of claim 2, wherein the processor is further configured to execute the instructions stored on said memory to additionally cause said server device to:

receive a provisioning request from the network device to provision the network device with the second internet service provider, the provisioning request includes a third key, and provision the network device with the first one or more privileges when the third key corresponds to the first key.

4. The server device of claim 3, wherein the processor is further configured to execute the instructions stored on said memory to additionally cause said server device to:

provision the network device with the second one or more privileges when the third key does not correspond to the first key.

5. The server device of claim 2, wherein the processor is further configured to execute the instructions stored on said memory to additionally cause said server device to:

create the second key using the first key, receive a provisioning request from the network device to provision the network device with the second internet service provider, the provisioning request includes a third key, and provision the network device with the first one or more privileges when the third key corresponds to the second key.

6. The server device of claim 5, wherein the processor is further configured to execute the instructions stored on said memory to additionally cause said server device to:

provision the network device with the second one or more privileges when the third key does not correspond to the second key.

7. The server device of claim 2, wherein the processor is further configured to execute the instructions stored on said memory to additionally cause said server device to:

obtain the unique data associated with the network device as a first MAC address of the network device, receive a provisioning request from the network device to provision the network device with the second internet service provider, the provisioning request includes a second MAC address of the network device, and provision the network device with the first one or more privileges when the first MAC address corresponds to the second MAC address.

8. The server device of claim 7, wherein the processor is further configured to execute the instructions stored on said memory to additionally cause said server device to:

provision the network device with the second one or more privileges when the first MAC address does not correspond to the second MAC address.

9. The server device of claim 2, wherein the processor is further configured to execute the instructions stored on said memory to additionally cause said server device to:

receive a provisioning request from the network device to provision the network device with the second internet service provider, the provisioning request includes second service provider information identifying the second internet service provider to provide service to the user via the network device, and provision the network device with the first one or more privileges when the second service provider information corresponds to the second internet service provider.

10. The server device of claim 9, wherein the processor is further configured to execute the instructions stored on said memory to additionally cause said server device to:

provision the network device with the second one or more privileges when the second service provider information does not correspond to the second service provider.

11. A method of a server device communicating with a network device via a communication channel to communicate data using a communication protocol, said method comprising:

communicating, by the server device, via a processor configured to execute instructions stored on a memory, by way of a first communication channel with a first internet service provider that is configured to communicate with the network device by way of a second communication channel;

obtaining, by the server device, via the processor configured to execute instructions stored on the memory, unique data that identifies the network device via the first communication channel, the unique data comprises a serial number, wherein the network device is associated with a service provided by the first internet service provider;

obtaining, by the server device from the first internet service provider, user information identifying an original user to be associated with the network device, obtaining, by the server device, from the first internet service provider, service provider information identifying the first internet service provider to provide service to the original user via the network device, storing into said memory, by the server device, the unique data, the user information, the service provider information and a first key, the first key being associated with the network device and generated using the unique data and data of the original user of the network device, wherein the data of the original user of the network device includes name, telephone number, email address, zip code and combinations thereof of the original user, and the first key is used to create a second key, wherein all information stored associated with the network device is not cloneable to another network device, subsequent to the storing the unique data, the user information, the service provider information and the first key into the memory, receiving, by the server device, a communication packet with a data payload from the first internet service provider associated with the network device to request provisioning of the network device, wherein the data payload comprises a field that identifies a unique identifier of the network device, a provider identifier (ID), a customer identifier (ID), a primary privileges field, a secondary privileges field and a key, wherein the primary privileges field identifies a first one or more privileges afforded to the network device when used by the original user and when receiving first one or more services from the first internet service provider, and the secondary privileges field identifies a second one or more privileges afforded to the network device when not used by the original user and when receiving one or more second services from a second internet service provider, wherein the first and second internet service providers are different internet service providers, in response to receiving the request for provisioning of the network device, determining, by the server device that the network device has been provisioned previously and that service provided to the network device by the first internet service provider was terminated, compare:
a) the unique data stored to the unique identifier of the network device in the data payload,
b) the service provider information stored with the provider ID in the data payload
c) the user information stored with the user ID in the data payload, and
d) the first key stored with the key in the data payload, when a match is determined for all information from steps a-d, provisioning the network device with the one or more privileges from the first internet service provider indicated in the data payload, when at least one of the steps a-d does not result in a match, preventing unauthorized migration of the network device by provisioning the network device with the one or more privileges from the second internet service provider indicated in the data payload.

12. The method of claim 11, further comprising:
storing, by the server device, via the processor and into the memory, the first one or more privileges associated with the network device when the network device is associated with the original user and the network device is associated with the first internet service provider.

13. The method of claim 12, further comprising:
receiving, by the server device, via the processor, a provisioning request from the network device to provision the network device with the second internet service provider, the provisioning request includes a third key; and
provisioning, by the server device, via the processor, the network device with the first one or more privileges when the third key corresponds to the first key.

14. The method of claim 13, further comprising:
provisioning, by the server device, via the processor, the network device with the second one or more privileges when the third key does not correspond to the first key.

15. The method of claim 12, further comprising:
creating, by the server device, via the processor, the second key using the first key;
receiving, by the server device, via the processor, a provisioning request from the network device to provision the network device with the second internet service provider, the provisioning request includes a third key; and
provisioning, by the server device, via the processor, the network device with the first one or more privileges when the third key corresponds to the second key.

16. The method of claim 15, further comprising:
provisioning, by the server device, via the processor, the network device with the second one or more privileges when the third key does not correspond to the second key.

17. The method of claim 12, further comprising:
obtaining, by the server device, via the processor, the unique data associated with the network device as a first MAC address of the network device;
receiving, by the server device, via the processor, a provisioning request from the network device to provision the network device with the second internet service provider, the provisioning request includes a second MAC address of the network device; and
provisioning, by the server device, via the processor, the network device with the first one or more privileges when the first MAC address corresponds to the second MAC address.

18. The method of claim 17, further comprising:
provisioning, by the server device, via the processor, the network device with the second one or more privileges when the first MAC address does not correspond to the second MAC address.

19. The method of claim 12, further comprising:
receiving, by the server device, via the processor, a provisioning request from the network device to provision the network device with the second internet service provider, the provisioning request includes second service provider information identifying the second service provider to provide service to the original user via the network device; and
provisioning, by the server device, via the processor, the network device with the first one or more privileges when the first internet service provider corresponds to the second internet service provider.

20. The method of claim 19, further comprising:
provisioning, by the server device, via the processor, the network device with the second one or more privileges when the first internet service provider does not correspond to the second internet service provider.

21. A non-transitory, computer-readable media having computer-readable instructions stored thereon, the computer-readable instructions being read by a server device for use with a network device, wherein the computer-readable instructions instructing the server device to perform steps comprising:
communicating, via a processor configured to execute instructions stored on a memory, by way of a first communication channel with a first internet service provider that is configured to communicate with the network device by way of a second communication channel;
obtaining from the first service provider, via the processor configured to execute instructions stored on the memory, unique data that identifies the network device, the unique data comprises a serial number;
obtaining from the first internet service provider, user information identifying an original user to be associated with the network device,
obtaining from the first internet service provider, service provider information identifying the first internet service provider to provide service to the original user via the network device,
storing into said memory, the unique data, the user information, the service provider information and a first key, the first key being associated with the network device and generated using the unique data and data of the original user of the network device, wherein the data of the original user of the network device includes name, telephone number, email address, zip code and combinations thereof of the original user, and the first key is used to create a second key, wherein all information stored associated with the network device is not cloneable to another network device, subsequent to the storing the unique data, the user information, the service provider information and the first key into the memory, receiving a communication packet with a data payload from the first internet service provider associated with the network device to request provisioning of the network device, wherein the data payload comprises a field that identifies a unique identifier of the network device, a provider identifier (ID), a customer identifier (ID), a primary privileges field, a secondary privileges field and a key, wherein the primary privileges field identifies a first one or more privileges afforded to the network device when used by the original user and when receiving first one or more services from the first internet service provider, and the secondary privileges field identifies a second one or more privileges afforded to the network device when not used by the original user and when receiving one or more second services from a second internet service provider, wherein the first and second internet service providers are different internet service providers, in response to receiving the request for provisioning of the network device, determining, that the network device has been provisioned previously and that service provided to the network device by the first internet service provider was terminated, compare:
  e) the unique data stored to the unique identifier of the network device in the data payload,
  f) the service provider information stored with the provider ID in the data payload
  g) the user information stored with the user ID in the data payload, and
  h) the first key stored with the key in the data payload,
when a match is determined for all information from steps a-d, provisioning the network device with the one or more privileges from the first internet service provider indicated in the data payload,
when at least one of the steps a-d does not result in a match, preventing unauthorized migration of the network device by provisioning the network device with the one or more privileges from the second internet service provider indicated in the data payload.

22. The non-transitory, computer-readable media of claim 21, wherein the computer-readable instructions further instructing the server device to perform the steps comprising:
storing, via the processor and into the memory, the first one or more privileges associated with the network device when the network device is associated with the original user and the network device is associated with the first internet service provider.

23. The non-transitory, computer-readable media of claim 22, wherein the computer-readable instructions further instructing the server device to perform the steps comprising:
receiving, via the processor, a provisioning request from the network device to provision the network device with the second internet service provider, the provisioning request includes a third key; and
provisioning, via the processor, the network device with the first one or more privileges when the third key corresponds to the first key.

24. The non-transitory, computer-readable media of claim 23, wherein the computer-readable instructions further instructing the server device to perform the steps comprising:
provisioning, via the processor, the network device with the second one or more privileges when the third key does not correspond to the first key.

25. The non-transitory, computer-readable media of claim 22, wherein the computer-readable instructions further instructing the server device to perform the steps comprising:
creating, via the processor, the second key using the first key;
receiving, via the processor, a provisioning request from the network device to provision the network device with the second internet service provider, the provisioning request includes a third key; and
provisioning, via the processor, the network device with the first one or more privileges when the third key corresponds to the second key.

26. The non-transitory, computer-readable media of claim 25, wherein the computer-readable instructions further instructing the server device to perform the steps method further comprising:
provisioning, via the processor, the network device with the second one or more privileges when the third key does not correspond to the second key.

27. The non-transitory, computer-readable media of claim 22, wherein the computer-readable instructions further instructing the server device to perform the steps comprising:
obtaining, via the processor, the unique data associated with the network device as a first MAC address of the network device;
receiving, via the processor, a provisioning request from the network device to provision the network device with the second internet service provider, the provisioning request includes a second MAC address of the network device; and
provisioning, via the processor, the network device with the first one or more privileges when the first MAC address corresponds to the second MAC address.

28. The non-transitory, computer-readable media of claim 27, wherein the computer-readable instructions further instructing the server device to perform the steps comprising:
provisioning, via the processor, the network device with the second one or more privileges when the first MAC address does not correspond to the second MAC address.

29. The non-transitory, computer-readable media of claim 22, wherein the computer-readable instructions further instructing the server device to perform the steps comprising:
receiving, via the processor, a provisioning request from the network device to provision the network device with the second internet service provider, the provisioning request includes second service provider information identifying the second internet service provider to provide service to the original user via the network device; and
provisioning, via the processor, the network device with the first set one or more privileges when the first service provider corresponds to the second service provider.

30. The non-transitory, computer-readable media of claim 29, wherein the computer-readable instructions further instructing the server device to perform the steps comprising:
provisioning, via the processor, the network device with the second one or more privileges when the first service provider does not correspond to the second service provider.

* * * * *